US012633836B2

(12) United States Patent
Ursino et al.

(10) Patent No.: US 12,633,836 B2
(45) Date of Patent: May 19, 2026

(54) POWER CONVERSION PHASES AND COUPLING INDUCTANCE

(71) Applicant: Infineon Technologies Austria AG, Villach (AT)

(72) Inventors: Mario Ursino, Villach (AT); Roberto Rizzolatti, Villach (AT)

(73) Assignee: Infineon Technologies Austria AG, Villach (AT)

( * ) Notice: Subject to any disclaimer, the term of this patent is extended or adjusted under 35 U.S.C. 154(b) by 464 days.

(21) Appl. No.: 18/093,148

(22) Filed: Jan. 4, 2023

(65) Prior Publication Data

US 2024/0223092 A1 Jul. 4, 2024

(51) Int. Cl.
H02M 3/335 (2006.01)
H02M 1/00 (2006.01)
H02M 3/00 (2006.01)
(52) U.S. Cl.
CPC ..... H02M 3/33569 (2013.01); H02M 1/0058 (2021.05); H02M 3/01 (2021.05)
(58) Field of Classification Search
CPC ......... H02M 3/33569; H02M 3/33571; H02M 3/3372; H02M 3/3376; H02M 3/3385; H02M 3/01; H02M 3/015; H02M 3/07; H02M 3/073; H02M 1/0058; H02M 1/0083; H02M 1/0085
See application file for complete search history.

(56) References Cited

U.S. PATENT DOCUMENTS

| | | | |
|---|---|---|---|
| 2021/0288576 A1* | 9/2021 | Rizzolatti | ............. H02M 1/007 |
| 2022/0209684 A1* | 6/2022 | Jin | ....................... H02M 3/1584 |
| 2022/0231601 A1* | 7/2022 | Jong | ................... H02M 1/0043 |

FOREIGN PATENT DOCUMENTS

EP 4047800 A1 8/2022

OTHER PUBLICATIONS

Extended Search Report, EP 23 21 8184, May 24, 2024, pp. 1-7.

\* cited by examiner

*Primary Examiner* — Nguyen Tran
(74) *Attorney, Agent, or Firm* — Armis IP Law, LLC

(57) ABSTRACT

An apparatus such as a power converter includes: a first capacitor; a second capacitor; a network of switches operative to control generation of an output voltage via: i) resonance of the first capacitor and a first transformer winding supplying first current to an output node of the power converter, and ii) resonance of the second capacitor and a second transformer winding supplying second current to an output node of the power converter. The first current may be substantially equal to the second current. The power converter may include additional windings in which other currents are substantially equal.

21 Claims, 18 Drawing Sheets

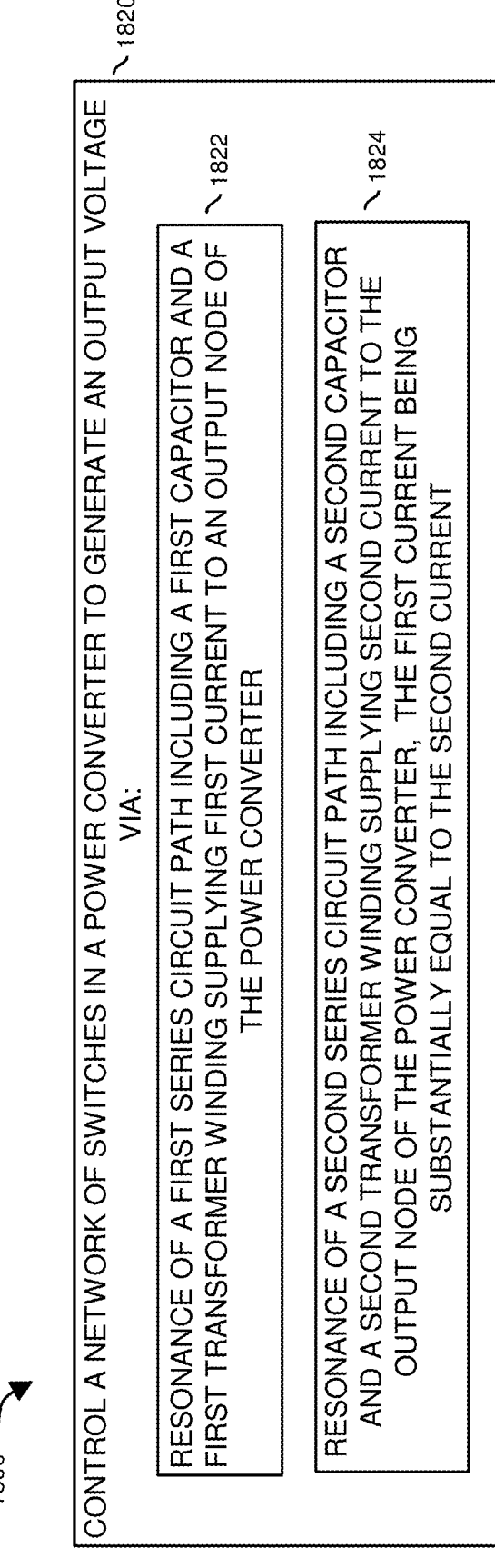

1800

1820

CONTROL A NETWORK OF SWITCHES IN A POWER CONVERTER TO GENERATE AN OUTPUT VOLTAGE VIA:

1822

RESONANCE OF A FIRST SERIES CIRCUIT PATH INCLUDING A FIRST CAPACITOR AND A FIRST TRANSFORMER WINDING SUPPLYING SUPPLYING FIRST CURRENT TO AN OUTPUT NODE OF THE POWER CONVERTER

1824

RESONANCE OF A SECOND SERIES CIRCUIT PATH INCLUDING A SECOND CAPACITOR AND A SECOND TRANSFORMER WINDING SUPPLYING SUPPLYING SECOND CURRENT TO THE OUTPUT NODE OF THE POWER CONVERTER, THE FIRST CURRENT BEING SUBSTANTIALLY EQUAL TO THE SECOND CURRENT

FIG. 18

POWER CONVERSION PHASES AND COUPLING INDUCTANCE

BACKGROUND

Data centers such as operated by Google™, Facebook™, and others provide indispensable services for our society. The energy consumption for all data centers worldwide is around 2% of overall electric energy usage. Therefore, datacenter providers are constantly looking to improve the efficiency of power conversion in order to save energy or to be able to increase the CPU/GPU/ASIC, etc., power of servers in existing data centers. Machine learning and artificial intelligent architectures require very powerful GPUs or custom designed ASICs to meet the required calculation power.

Operating a power supply system with 40 VDC to 60 VDC input voltage bus instead of 12-V bus offers serval advantages.

A first stage of a conventional power supply converts a high input voltage down to an intermediate voltage. The first stage can be an unregulated or regulated. The first stage may be highly efficient and densely steps down the voltage from an intermediate bus converter (IBC). The second stage can be based on the common buck converter with very good transient response and high efficiency.

Covering wide input range from 40V to 60V with a 4:1 fixed-ratio converter results in a Vout change from approximately about 9-V to 15-V which provides a good combination of efficiency and dynamic performance.

At 40V input, a 4:1 fixed ratio converter produces about 9.2-V output at full load. This forces the converter to operate with 20% higher output current comparing with nominal operating condition. A regulated IBC has a constant 12V output voltage over the full input voltage range so the current increase for fixed-load power is considerably less, yielding a significant saving in conduction losses. Another benefit is that at maximum input voltage (60V) the output voltage is reaches high voltages, typically 14.5-V, which makes the following PoLs less efficient.

One more benefit of a regulated IBC is that peripherals like PCIE, HD, FAN require a regulated 12-V rail, which cannot be supplied from an unregulated IBC converter.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

This disclosure further includes the observation that power conversion efficiency and/or density of conventional power supplies can be improved. For example, to this end, this disclosure includes novel ways of providing improved performance and density (such as smaller circuits providing more power) of power conversion via balanced generation of current in different legs of a respective power converter.

More specifically, this disclosure includes an apparatus (such as power converter, power converter stage, etc.) comprising: a first capacitor; a second capacitor; a network of switches operative to control generation of an output voltage via: i) resonance of the first capacitor and a first transformer winding supplying first current to an output node of the power converter, and ii) resonance of the second capacitor and a second transformer winding supplying second current to an output node of the power converter. The first current may be substantially equal to the second current.

The first capacitor may be a first flying capacitor; the second capacitor may be a second flying capacitor.

The power converter may further include an inductor device coupled between the output node and a load. The inductor device may output an output voltage from the inductor device based on the first current and the second current to power the load. The power converter may further include a controller operative to control states of the switches based on a comparison of a magnitude of the output voltage to setpoint reference voltage.

The power converter may further include a transformer assembly including the first transformer winding magnetically coupled to the second transformer winding.

The power converter may further include a first auto-transformer including the first transformer winding and a second auto-transformer including the second transformer winding.

Still further, as discussed herein, the first transformer winding and the second transformer winding may provide zero voltage switching of the switches.

As further discussed herein, the first current may flow through the first capacitor to a node of the first transformer winding in a first portion of a control cycle during resonance of the first capacitor and the first transformer winding; the second current may flow from a node of the second capacitor through the second transformer winding in the first portion of the control cycle during resonance of the second capacitor and the second transformer winding.

Yet further, the power converter as discussed herein may include: i) an input voltage node to receive an input voltage; and ii) a controller operative to control switching of the switches to provide unregulated conversion of the input voltage into an output voltage, the output voltage generated from the first current and the second current.

The power converter may further include: an input voltage node to receive an input voltage; and a controller operative to control switching of the switches to provide regulated conversion of the input voltage into an output voltage, the output voltage regulated with respect to a desired setpoint reference voltage.

Additionally, as further discussed herein, the power converter may include: a third winding; a fourth winding; a first transformer assembly including the first transformer winding magnetically coupled to the third transformer winding; a second transformer assembly including the second transformer winding magnetically coupled to the fourth transformer winding; and a controller operative to control switching of the network of switches between a first mode and a second mode for each respective control cycle of multiple control cycles of converting an input voltage into an output voltage at the output node. The network of switches may be further operative to control generation of the output voltage via the first mode, the first mode including: i) charging of the first capacitor during resonance of the first capacitor and the first transformer winding supplying the first current to an output node of the power converter for a first portion of a respective control cycle, and ii) discharging of the second capacitor during resonance of the second capacitor and the second transformer winding supplying the second current to the output node of the power converter for the first portion of the respective control cycle.

Yet further, the network of switches may be operative to control generation of the output voltage via the second mode, the second mode including: i) charging of the second capacitor during resonance of the second capacitor and the third transformer winding for a second portion of the respective control cycle, the third transformer winding supplying third current to the output node of the power converter, and ii) discharging of the first capacitor during resonance of the first capacitor and the fourth transformer winding for the second portion of the respective control cycle, the fourth transformer winding supplying fourth current to the output node of the power converter. The third current may be substantially equal to the fourth current. Still further, the first current, the second current, the third current, and the fourth current may be substantially equal to each other.

The first mode as discussed herein may include the controller: i) connecting a series combination of the first capacitor and the first transformer winding between an input voltage source producing the input voltage and the output node during a first portion of the respective control cycle; and ii) connecting the second capacitor and the second transformer winding in series between a reference voltage source and the output node during the first portion of the respective control cycle. The second mode as discussed herein may include the controller: i) connecting the series combination of the second transformer winding between the reference voltage source and the output node during a second portion of the respective control cycle; and ii) connecting the first transformer winding between the reference voltage source and the output node during the second portion of the respective control cycle.

The first mode as discussed herein may further include: i) connecting the third transformer winding between the reference voltage source and the output node during the first portion of the respective control cycle; and ii) connecting the fourth transformer winding between the reference voltage source and the output node during the first portion of the respective control cycle; the second mode as discussed herein may further include: i) connecting the second capacitor and the third transformer winding in series between the input voltage source and the output node during the second portion of the respective control cycle; and ii) connecting the first capacitor and the fourth transformer winding in series between the reference voltage source and the output node during the second portion of the respective control cycle; the first transformer winding may be magnetically coupled to the third transformer winding; and the second transformer winding may be magnetically coupled to the further transformer winding.

The power converter may further include a transformer assembly in which each of the first transformer winding, the second transformer winding, the third transformer winding, and the fourth transformer winding are magnetically coupled to each other via magnetic permeable material disposed in the transformer assembly.

As further discussed herein, the first mode may include, via control of the network of switches by the controller: i) creating a first series circuit path including a series connection of the first capacitor, the first transformer winding, and the third transformer winding in a first series circuit path between an input voltage source producing the input voltage and a reference voltage source during a first portion of the respective control cycle; and ii) creating a second series circuit path including a series connection of the fourth transformer winding, the second transformer winding, and the second capacitor in a second series circuit path between a first instance of the reference voltage source and a second instance of the reference voltage source during the first portion of the respective control cycle. The second mode as discussed herein may include, via control of the network of switches by the controller: i) creating a third series circuit path including a series connection of the first capacitor, the fourth transformer winding, and the second transformer winding between a third instance of the reference voltage source and a fourth instance of the reference voltage source during the second portion of the respective control cycle; and ii) creating a fourth series circuit path including a series connection of the second capacitor, the third transformer winding, and the first transformer winding in a fourth series circuit path between the input voltage source and the third instance of the reference voltage source during the second portion of the control cycle.

Further examples herein include a method comprising: controlling a network of switches in a power converter to generate an output voltage via: i) resonance of a first series circuit path including a first capacitor and a first transformer winding supplying first current to an output node of the power converter, and ii) resonance of a second series circuit path including a second capacitor and a second transformer winding supplying second current to the output node of the power converter; and the first current being substantially equal to the second current.

Note that this disclosure includes useful techniques. For example, in contrast to conventional techniques, the novel power supply as described herein provides high efficiency of converting an input voltage to a respective output voltage. More specifically, this disclosure includes a novel method, apparatus, system, etc., to balance output current from multiple paths in a power converter.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different techniques as described herein.

Other aspects of the present disclosure include software programs and/or respective hardware to perform any of the operations summarized above and disclosed in detail below.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of techniques herein (BRIEF DESCRIPTION) purposefully does not specify every novel aspect of the present disclosure or claimed invention(s). Instead, this brief description only presents general aspects and corresponding points of novelty over conventional techniques. For additional details and/or possible perspectives (permutations) of the invention(s), the reader is directed to the Detailed Description section (which is a summary) and corresponding figures of the present disclosure as further discussed below.

BRIEF DESCRIPTION OF THE DRAWINGS

FIG. 5 is an example timing diagram illustrating control of multiple switches in a power converter as described herein.

FIG. 18 is an example diagram illustrating a general method as described herein.

Figure 1:
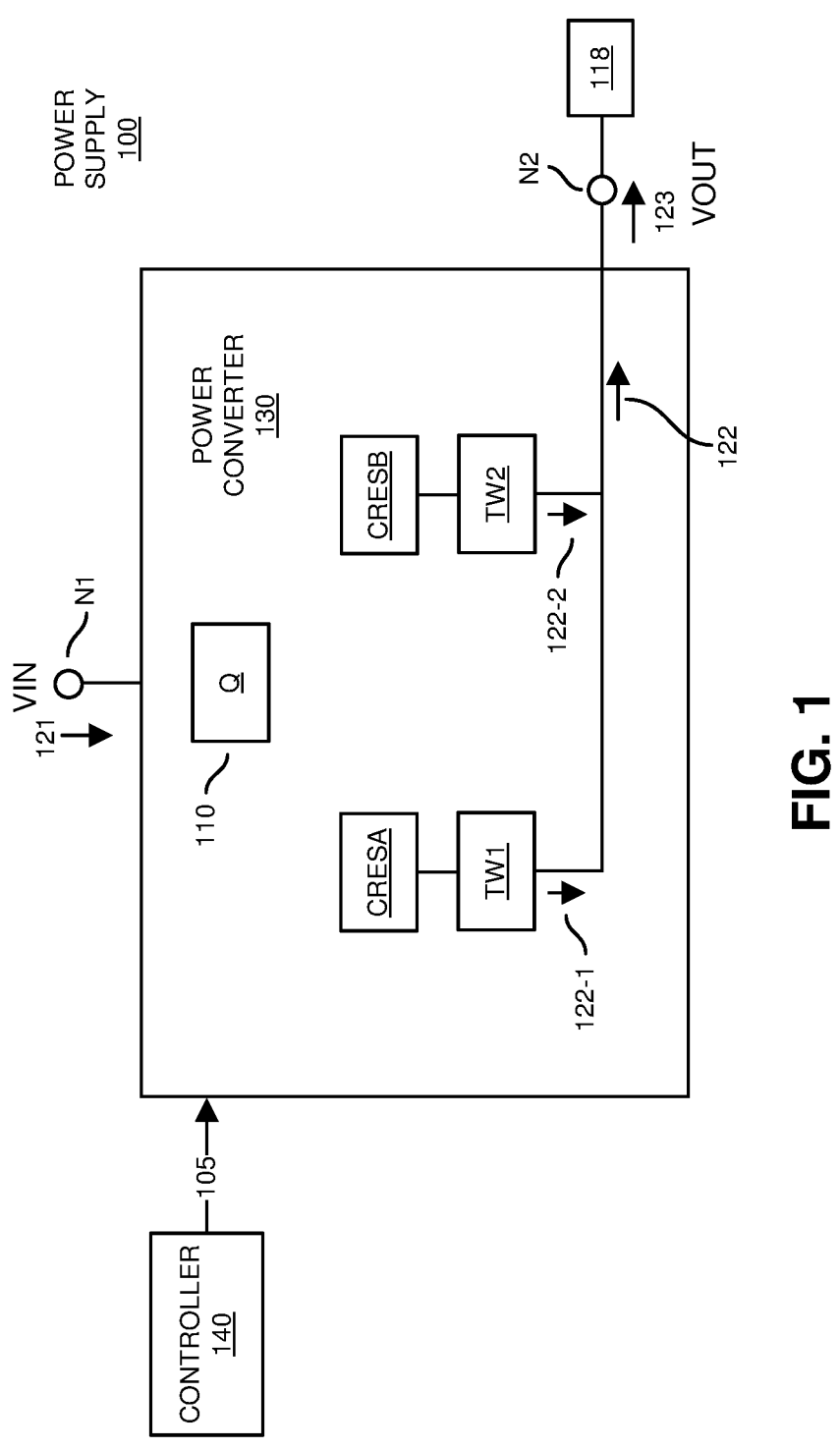
FIG. 1 is an example diagram illustrating a voltage converter including multiple resonant circuit paths as discussed herein.

The foregoing and other objects, features, and advantages of the disclosed matter herein will be apparent from the following more particular description herein, as illustrated in the accompanying drawings in which like reference characters refer to the same parts throughout the different views. The drawings are not necessarily to scale, with emphasis instead being placed upon illustrating the principles, concepts, aspects, techniques, etc.

DETAILED DESCRIPTION

As previously discussed, the different configurations of power converters as presented in disclosure are useful over conventional techniques. For example, in contrast to conventional techniques, the novel power supply as described herein provides equalization of current from different pairs of legs (circuit paths) of a power converter to produce a respective output voltage to power a load.

Now, more specifically, FIG. 1 is an example diagram illustrating a novel voltage converter including multiple resonant circuit paths as discussed herein.

As shown in FIG. 1, power supply 100 includes a controller 140 and power converter 130 to produce an output voltage 123 to power a load 118. Each of these components represents an entity such as an apparatus, electronic device, electronic circuitry, etc.

Note further that each of the resources as described herein can be instantiated in any suitable manner. For example, the controller 140 can be instantiated as or include hardware (such as circuitry), software (executable instructions), or a combination of hardware and software resources where applicable.

Yet further, the power converter 130 in this example may include multiple switches Q (a.k.a., network of switches 110), a first resonant capacitor component CRESA (such as a first flying capacitor or resonant capacitor), a first transformer winding TW1, a second resonant capacitor component CRESB (such as a second flying capacitor or resonant capacitor), and a second transformer winding TW2.

During operation, the network of switches 110 (a.k.a., Q) controls conveyance of energy from different circuit paths to the output node N2 of the power converter 130 to produce the output voltage 123. For example, the controller 140 generates control signals 105 to control network of switches 110. As further discussed herein, control of the network of switches 110 results in generation of an output voltage 123 based on: i) resonance of the first capacitor CRESA and a first transformer winding TW1 (such as first circuit path) supplying first current 122-1 to an output node N2 of the power converter 130, and ii) resonance of the second capacitor CRESB and a second transformer winding TW2 (such as second series circuit path) supplying second current 122-2 to an output node N2 of the power converter 130.

As discussed herein, desirably, the first current 122-1 may be substantially equal to the second current 122-2 to produce the output current 122.

Yet further as further discussed herein, note that more specific instances of the power supply 100 and/or power converter 130 may include a new topology to convert an input voltage into an output voltage with a 4:1 ratio (such as 48 VDC to 12 VDC or other suitable ratio). The power converter topology may be a hybrid circuit, using a combination of components such as capacitors and transformer windings or transformers. This disclosure includes a new arrangement of transformers and capacitors to obtain power delivery through two separate transformers with the use of a single resonant capacitor set.

Typically, a set of resonant capacitors is used with a single autotransformer in a conventional power converter application. In a multi-phase operation, each phase is usually replicated. As discussed herein, in contrast to conventional techniques, a transformer may be doubled, while the rest of the circuit remains the same. This enables higher power output density such as greater output power with a same bill of material otherwise associated with a single power converter phase.

According to one example as discussed herein, two sets of windings can be folded or implemented into a single magnetic core to obtain a new power converter 100-1 (such as a S-HSC converter). One or more instances of the power supply 100 may be a 4:1 Hybrid Switched Capacitor converter with lowered AC resistance, with the same bill of material and transformer occupation as a state-of-the-art solution. As further discussed herein, it is noted that supplying two sets of windings instead of only one (in potentially the same winding area) as discussed herein enables better copper utilization at high frequency.

This, ultimately, results in an increased efficiency due to the main current harmonic experiencing lower copper resistance.

The following converter variations all operate with resonant currents flowing in these resonant tanks:

CRESA (a.k.a., $$C_{res}^A)$$

with leakage inductance of WA winding set and CRESB (a.k.a., $$C_{res}^B)$$

with leakage inductance of WB in the first half of the switching cycle;

CRESB $$(C_{res}^B)$$

with leakage inductance of WA winding set and CRESA $$(C_{res}^A)$$

with leakage inductance of WB in the second half of the switching cycle.

Figure 2:
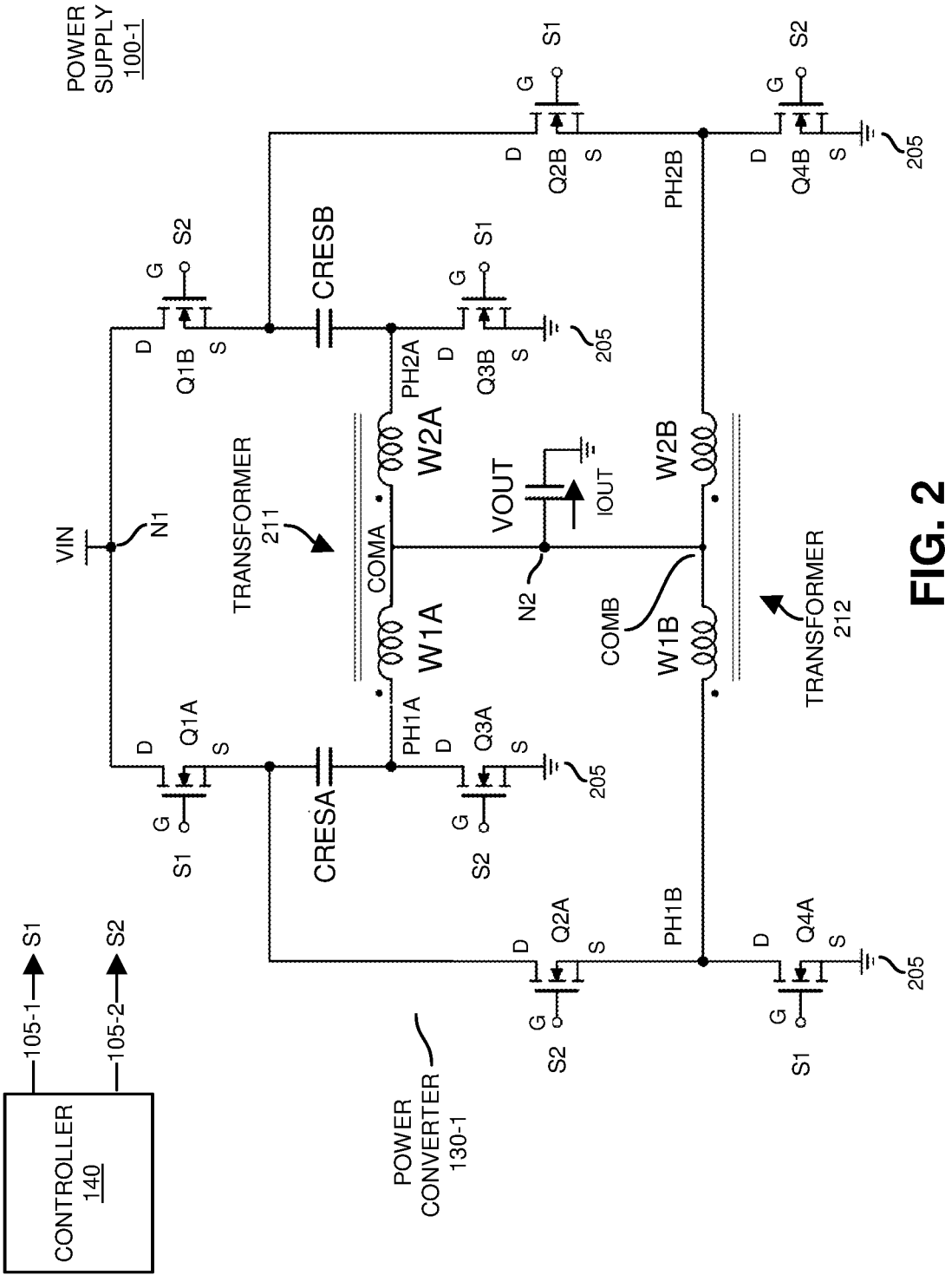
FIG. 2 is an example detailed diagram illustrating a power converter as described herein.

FIG. 2 is an example diagram illustrating a two-phase hybrid resonant power converter architecture based on two transformers and a single set of resonant capacitors.

As shown in this example, the power supply 100-1 and corresponding power converter 130-1 can be configured to include a network of switches 110 including switch Q1A, switch Q2A, switch Q3A, switch Q4A, switch Q1B, switch Q2B, switch Q3B, and switch Q4B. The power converter 130-1 further includes capacitors CRESA (such as a flying capacitor) and CRESB (such as a flying capacitor), controller 140, and transformer windings W1A, W2A, W1B, and W2B.

In this example, the transformer winding W1A is magnetically (a.k.a., inductively) coupled to transformer winding W2A in transformer 211. The transformer winding W1B is magnetically (a.k.a., inductively) coupled to transformer winding W2B in transformer 212.

Note that the transformer 211 may be a first auto-transformer; the second transformer may be a second auto-transformer 212. The circuitry associated with the power converter 130-1 including transformer windings may provide zero voltage switching of the network of switch 110.

As further shown, the drain node D of the switch Q1A (such as a field effect transistor or other suitable entity) is connected to the input voltage source node N1 to receive input voltage VIN; the source node S of switch Q1A is connected to the capacitor CRESA and the drain node of switch Q2A; the source node of switch Q2A is connected to the drain node of switch Q4A at node PH1B; the source node of switch Q4A is connected to ground reference potential 205. The capacitor CRESA is further connected to the drain node D of switch Q3A at the node PH1A; the source node of switch Q3A is connected to the ground reference potential 205; the transformer winding W1A is connected between the node PH1A and the node COMA (a.k.a., node N2). The transformer winding W1B is connected between the node PH1B and the node COMB (node N2). Noe N2 outputs a respective output voltage VOUT to power a load.

As further shown, the drain node D of the switch Q1B is connected to the input voltage source node N1 to receive the input voltage VIN; the source node S of switch Q1B is connected to the capacitor CRESB and the drain node of switch Q2B; the source node of switch Q2B is connected to the drain node D of switch Q4B at node PH2B; the source node of switch Q4B is connected to ground reference potential 205. The capacitor CRESB is connected to the drain node D of switch Q3B at the node PH2A; the source node of switch Q3B is connected to the ground reference potential 205; the transformer winding W2A is connected between the node PH2A and the node COMA (a.k.a., node N2). The transformer winding W2B is connected between the node PH2B and the node COMB (node N2).

During operation, the controller 140 generates control signal S1 (a.k.a., control signal 105-1) and control signal S2 (a.k.a., control signal 105-2). The control signal S1 controls operation of switches Q1A, Q2B, Q3B, and Q4A. The control signal S2 controls operation of switches Q1B, Q2A, Q3A, and Q4B. A logic high state of a control signal controls a respective switch to an ON-state (low impedance path between a respective drain node and source node); a logic low state of a control signal controls a respective switch to an OFF-state (high impedance path between a respective drain node and source node).

When compared to conventional techniques, power output associated with the power converter 100-1 may be increased similarly to a two-phase converter, with the advantage of using a single set of resonant capacitors and a single set of controller/drivers such as associated with controller 140.

Figure 3:
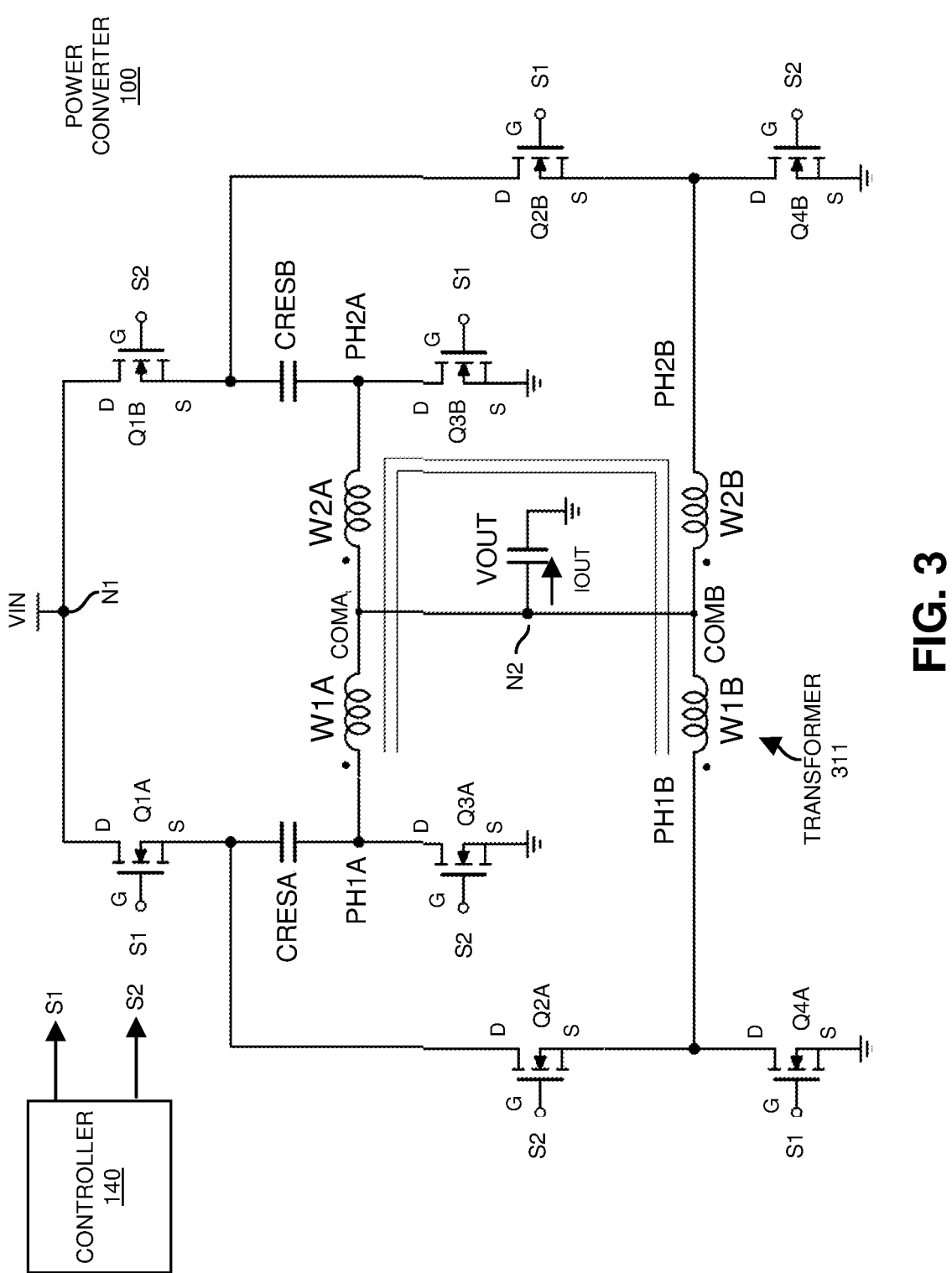
FIG. 3 is an example detailed diagram illustrating a power converter as described herein.

Ultimately, it can be seen that the two sets of windings operate with the same currents in each instant if the physical layout is well made. This means that the two sets of windings can be inserted in a single magnetic core maintaining the four phase nodes as shown in FIG. 3. In other words, FIG. 3 is an example diagram illustrating an implementation of the power converter 130-2 in which the transformer windings are disposed in a common transformer 311 in which the transformer windings W1A, W1B, W2A, and W2B are all magnetically (inductively) coupled to each other. In this way, currents are forced in two nodes while other two nodes are reference to ground.

Figure 4:
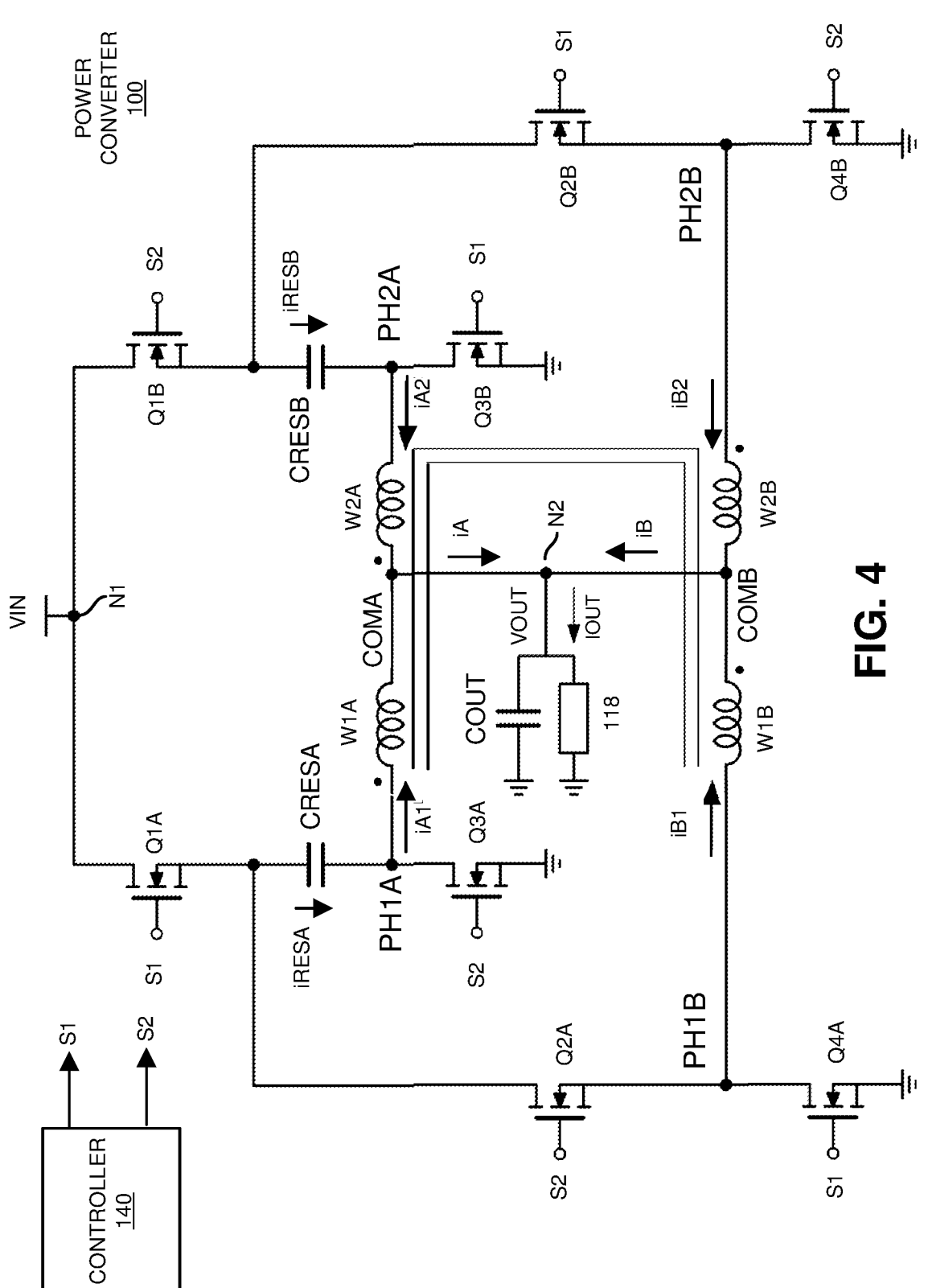
FIG. 4 is an example diagram illustrating operation of a power converter to produce an output voltage as discussed herein.

FIG. 4 is an example diagram illustrating flow of current in power converter to produce an output voltage as discussed herein.

In this example, the capacitor CRESA supplies current iRESA; the capacitor CRESB supplies current iRESB. The total current IOUT from node N2 to the load 118 is iA plus iB. Current iA equals current iA1 plus current iA2. Current iB equals current iB1 plus current iB2.

Control of the corresponding power converter 130-1 and generation of current is further discussed below. If desired, the input voltage node N1 receive input voltage VIN (such as DC voltage); the controller 140 may control switching of the network of switch 110 to provide unregulated conversion of the input voltage VIN into an output voltage 123. The output voltage 123 is generated from one or more of current iA1, current iA2, current iB1, and current iB2.

In this example, the proposed voltage converter 130-1 such as so-called a Symmetrical Hybrid Switched Capacitor Converter (S-HSC) comprises an interleaved flying capacitor structure connected to two autotransformers where the second one is connected through two by-pass MOSFET as shown in FIGS. 3 and 4 (with currents and voltages references).

Note that an additional inductance in parallel between the drains of Q3A and Q3B and/or the drains of Q4A and Q4B can be added to achieve zero voltage switching (ZVS) for all switches (such as MOSFETs or field effect transistors). However, in most of the applications, to achieve high power density, such inductance can be also integrated in the auto-transformer.

Note further that all switches can be divided into two switch groups such as a first switch group including switches Q1A, Q4A, Q2B and Q3B (controlled by control signal S1), and a second switch group including switches Q1B, Q4B, Q2A and Q3A controlled by control signal S2, which is generally a control signal that is 180° phase shifted with respect to control signal S1. The control signal S1 and the control signal can be configured to have the same duty cycle. In one example, the controller 140 generates the control signals S1 and S2 with a fixed duty cycle such as ideally near 50% or other suitable value to obtain the minimum RMS (Root Mean Square) current. If desired, a dead-time can be inserted at appropriate times to achieve ZVS (so-called Zero Voltage Switching) as further discussed herein.

To ensure appropriate operation of the voltage converter 130-1, the turn number of each winding can be configured to be the same (i.e. W1A=W1B and W2A=W2B).

The output voltage 123 is given by the following equation, where R_(out,S-HSC) is the output impedance of the converter 130-1.

$$Vout/Vin = 1/4Rout * Iout \qquad \text{(equation 1)}$$

One property of the proposed converter as discussed herein is to take advantage from the leakage inductance of the two autotransformers to soft charge the flying capacitors CRESA and CRESB, which are flying capacitors, enabling use of lower voltage related switches (such as MOSFETs). The switches Q1x, Q3x and Q4x are blocking a portion of the input voltage which can be defined by the following equation:

$$V\_max(Q1x, Q3x) = V\_in/2 \qquad \text{(equation 2)}$$

Q2x have to block the entire input voltage V_in.

However, one of the benefits introduced by the voltage converter 130-1 is the symmetric behavior of producing respective output current from each of 4 circuit paths, which gives three important advantages:

the voltage converter is powered any time from the input supply voltage VIN, reducing the input current ripple comparing with other ZSC power converters.

the voltage converter 130-1 can be built with two auto-transformers, each carrying half of the output load current the voltage converter 130-1 and corresponding autotrans-formers can be merged within one core resulting in a reduction of AC resistance in the windings. More details are discussed below.

Figure 5:
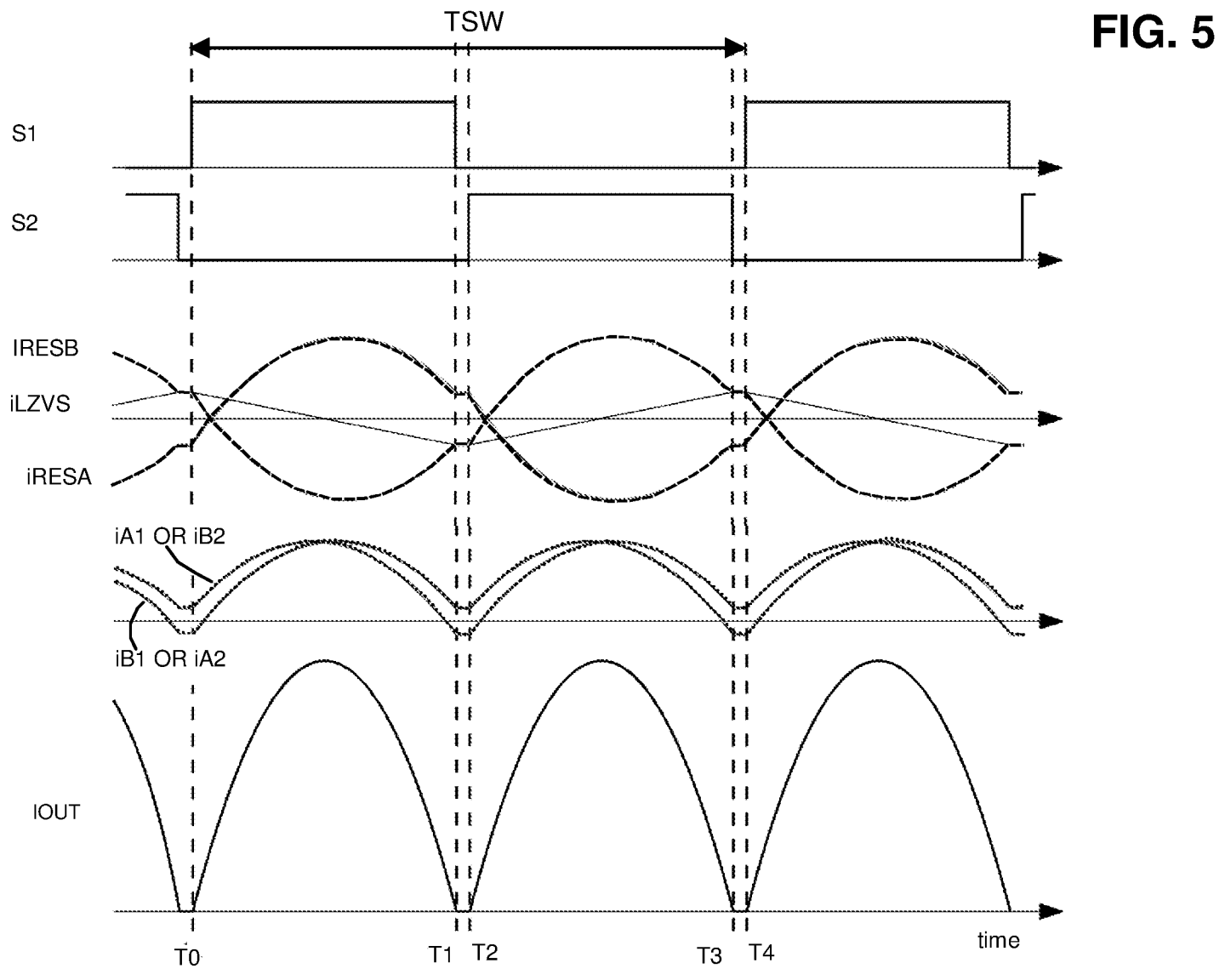

FIG. 5 is an example timing diagram illustrating control of multiple switches in a power converter as described herein.

In this example, the graph 500 illustrates settings of control signals S1 and S2 over time and corresponding magnitudes of current associated with the voltage converter 130-1. For example, for a first control cycle (TSW) of multiple control cycles, the control signal S1 is set to a logic high state between time T0 and time T1; the control signal S1 is set to a logic low state between time T1 and time T4.

Further, for the first control cycle, the control signal S2 is set to a logic low state between time T0 and time T2; the control signal S2 is set to a logic high state between time T2 and time T3; the control signal S2 is set to a logic low state between time T3 and time T4. All switches are off during the dead time such as between time T1 and time T2 as well as between time T3 and time T4.

As shown in this example, the magnitude of the respective current iA1 is substantially equal to the magnitude of the current iB2; the magnitude of the respective current iA2 is substantially equal (such as magnitudes being within 5% of each other) to the magnitude of the current iB1. In general, the respective current iRESA and iRESB are approximately sinusoidal in nature. The voltage converter 130-1 provides rectification to produce currents iA1, iB2, iA2, and iB1. As previously discussed, the summation of the currents iA1, iB2, iB1, and iA2 produces the output current IOUT from node N2.

Thus, the voltage converter 130-1 as discussed herein includes: a first capacitor CRESA (such as a first flying capacitor); a second capacitor CRESB (such as a second flying capacitor); a network of switches 110 operative to control generation of an output voltage 123 via: i) resonance of the first capacitor CRESA and a first transformer winding W1A supplying first current iA1 to an output node N2 of the power converter 130-1, and ii) resonance of the second capacitor CRES2 and a second transformer winding W1B supplying second current iB2 to an output node N2 of the power converter 130-1; and the first current iA1 being substantially equal to the second current iB2. As previously discussed, each of the transformer windings W1A, W2A, W1B, and W2B can be magnitude coupled to each other.

As further shown in graph 500, the current iA1, the current iB2, the current iB1, and current iA2 are all sub-stantially equal to each other.

Figure 14:
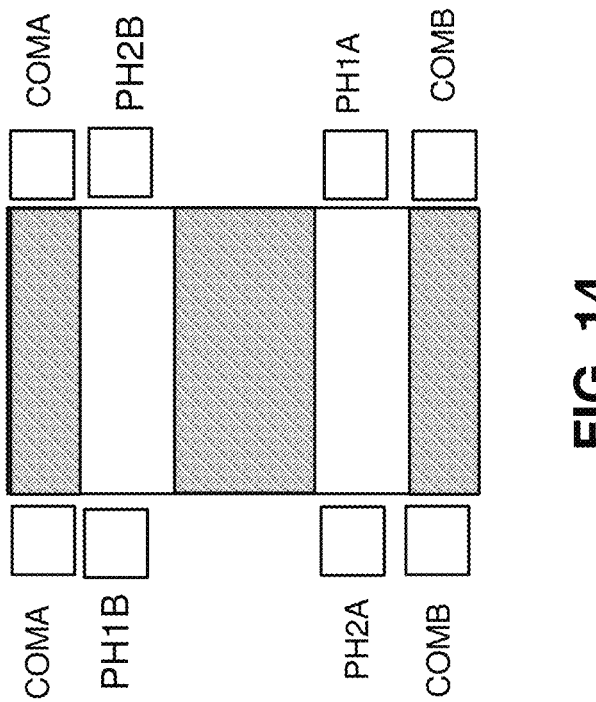
FIG. 14 is an example diagram illustrating of a transformer assembly as discussed herein.

Note that one enabler for high efficiency and high-power density of the proposed power converter such as S-HSC is the opportunity to use lower voltage rating switches (such as MOSFETs) and the chance to use Class II ceramic capacitors which inherently offer high capacitance density. Moreover, the additional inductor L_zvs or the magnetizing inductance of two autotransformers or a single, merged autotransformer provide the inductive energy to ensure Zero Voltage Switching (ZVS) transition for all MOSFETs. Note that the two separated autotransformers do not necessarily provide the most significant benefit. For example, the most beneficial arrangement is the merged one (such as in FIG. 3). In fact, the two separated autotransformers (FIG. 2) yield an increase in size due to occupation of the doubled magnetic cross-section. That arrangement is 1) useful to understand the merged one and 2) maybe interesting in some particular layouts. It is noted that the SR arrangement can be improved because each paralleled SR is now split and distributed around the autotransformer (FIG. 14, 15, 16).

The proposed S-HSC may be configured to include two autotransformers where the windings W1A and W2A are part of a winding pack A (such as transformer 211) and the windings W1B and W2B are part of another winding pack B (such as transformer 212). To achieve better core utilization, W1A, W1B, W2A and W2B can be wrapped around the same core of magnetic permeable material.

Considering now winding pack A, and considering W1A as "primary windings" and W2A as "secondary windings" (i.e. connected respectively between node PH1A to node COMA and from node COMA to node PH2A. In the light of the well-known conventions of the transformer, "primary windings" are considered as primary side windings whilst "secondary windings" are considered as secondary windings, considering an ideal autotransformer and taking into consideration that the Magneto Motive Force (MMF) is established by iA1 at primary side, it must be counted by an MMF in the secondary side by iA2.

Using Wxy as the turn number of the respective winding, the following equation is valid:

$$W1A[iA1] = W2A[iA2] \qquad \text{(equation 3)}$$

With equal turns W1A=W2A it follows that iph1A (t)=iph2A (t).

Similar consideration can be taken for core B, resulting in the following equation:

$$W1B[iB1] = W2B[iB2] \qquad \text{(equation 4)}$$

With W1B=W2B it follows that iph1B (t)=iB2 (t).

As before mentioned, S-HSC comprises two winding packs, each one comprising two windings. Considering such arrangement, we consider as "primary windings" W1A and W1B whilst for "secondary windings" W2A and W2B are taken. Considering an ideal autotransformer and taking into consideration the MMF is established by iA1 and iB1 at "primary windings", it must be counted by an MMF in the "secondary windings" by iA2 and iB2. In this scenario the following equation is always valid:

$$W1A[iA1] + W1B[iB1] = W2A[iA2] + W2B[iB2] \qquad \text{(equation 5)}$$

In other words, current iA1 equals current iB2 over each of multiple control cycles. Current iA2 equals current iB1 over each of multiple control cycles.

Figure 6:
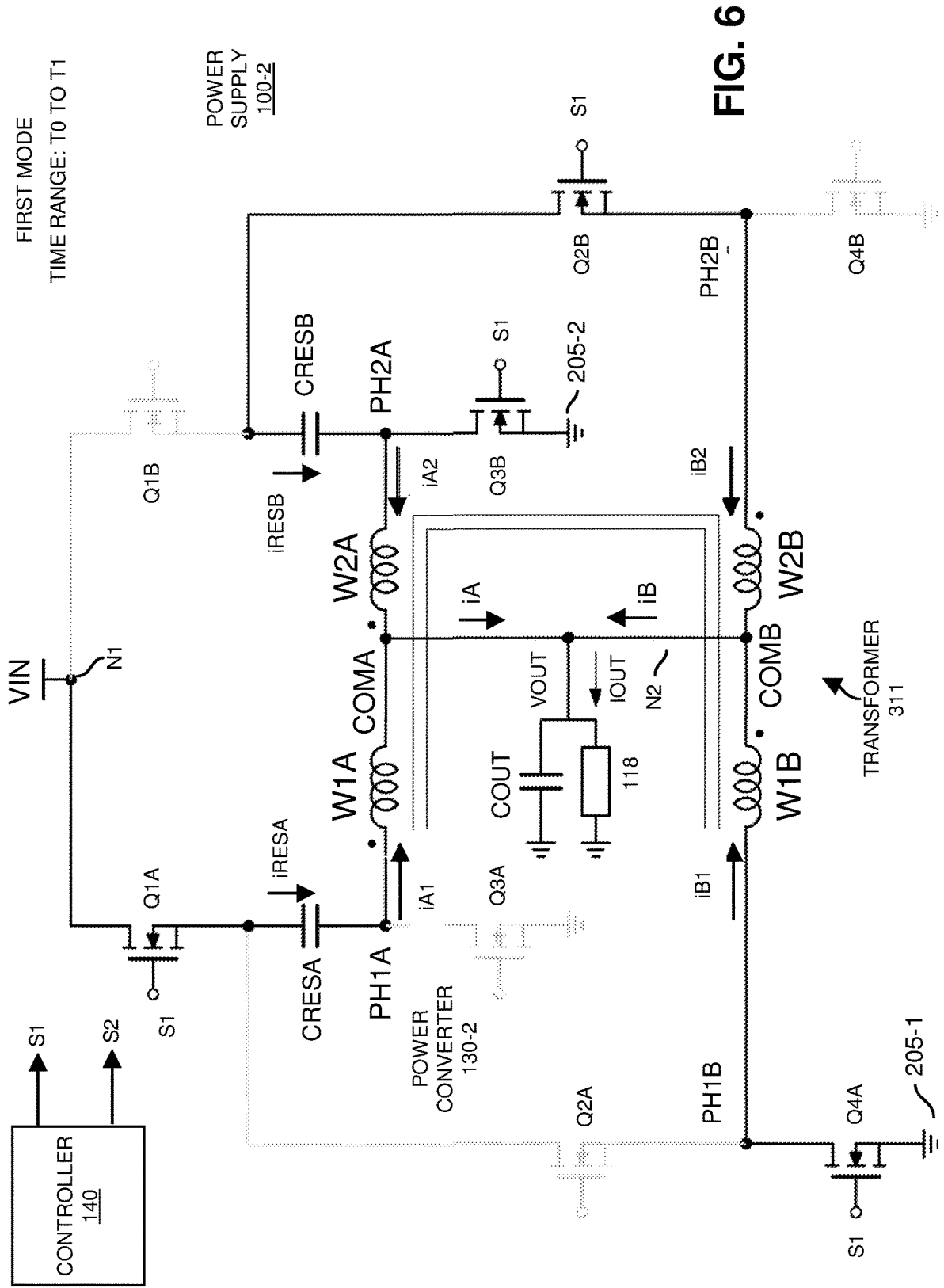
FIG. 6 is an example diagram illustrating operation of a power converter in a first mode as described herein.

FIG. 6 is an example diagram illustrating operation of a power converter in a first mode as described herein.

Figure 7:
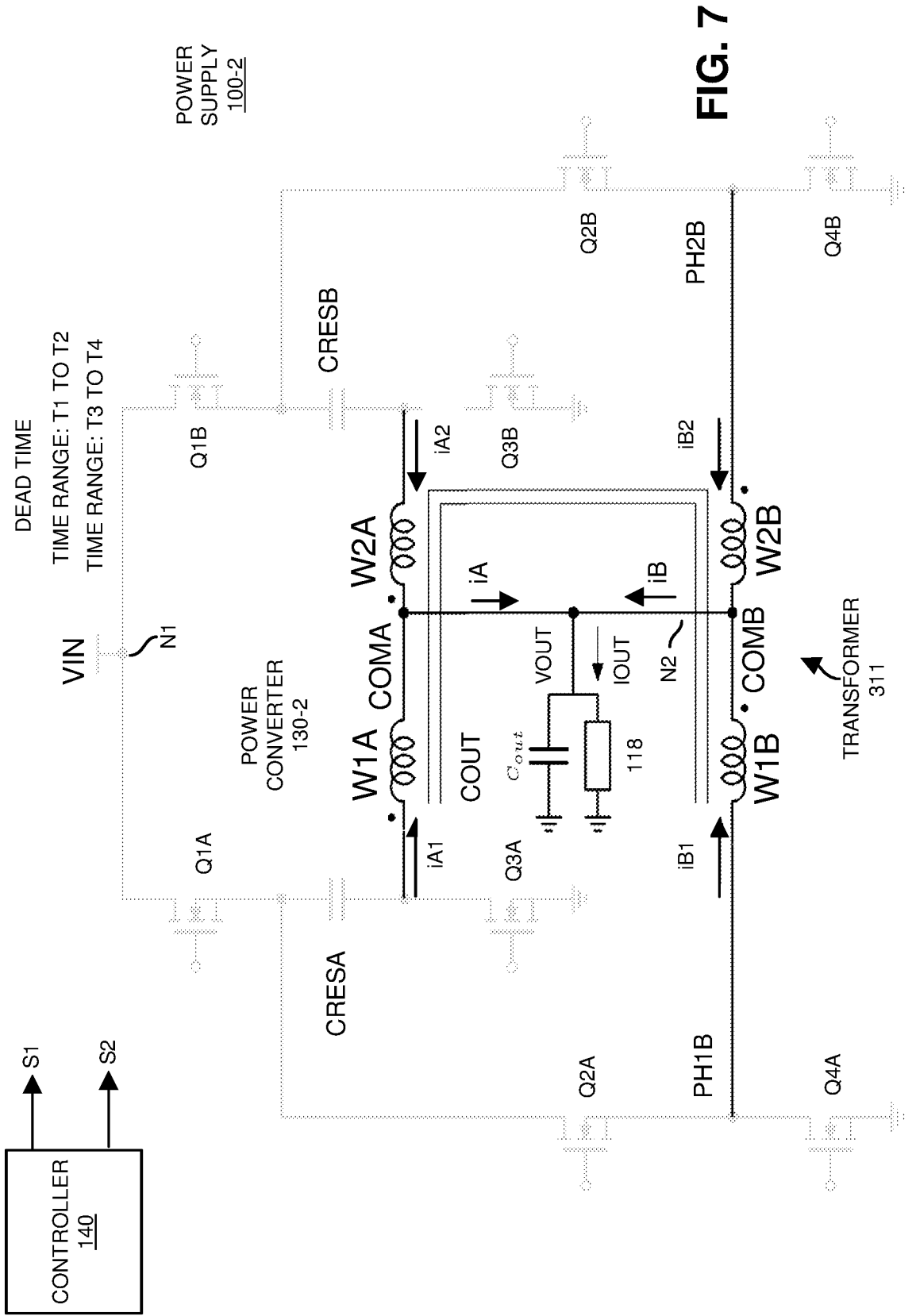
FIG. 7 is an example diagram illustrating operation of a power converter in a second mode as described herein.
Figure 8:
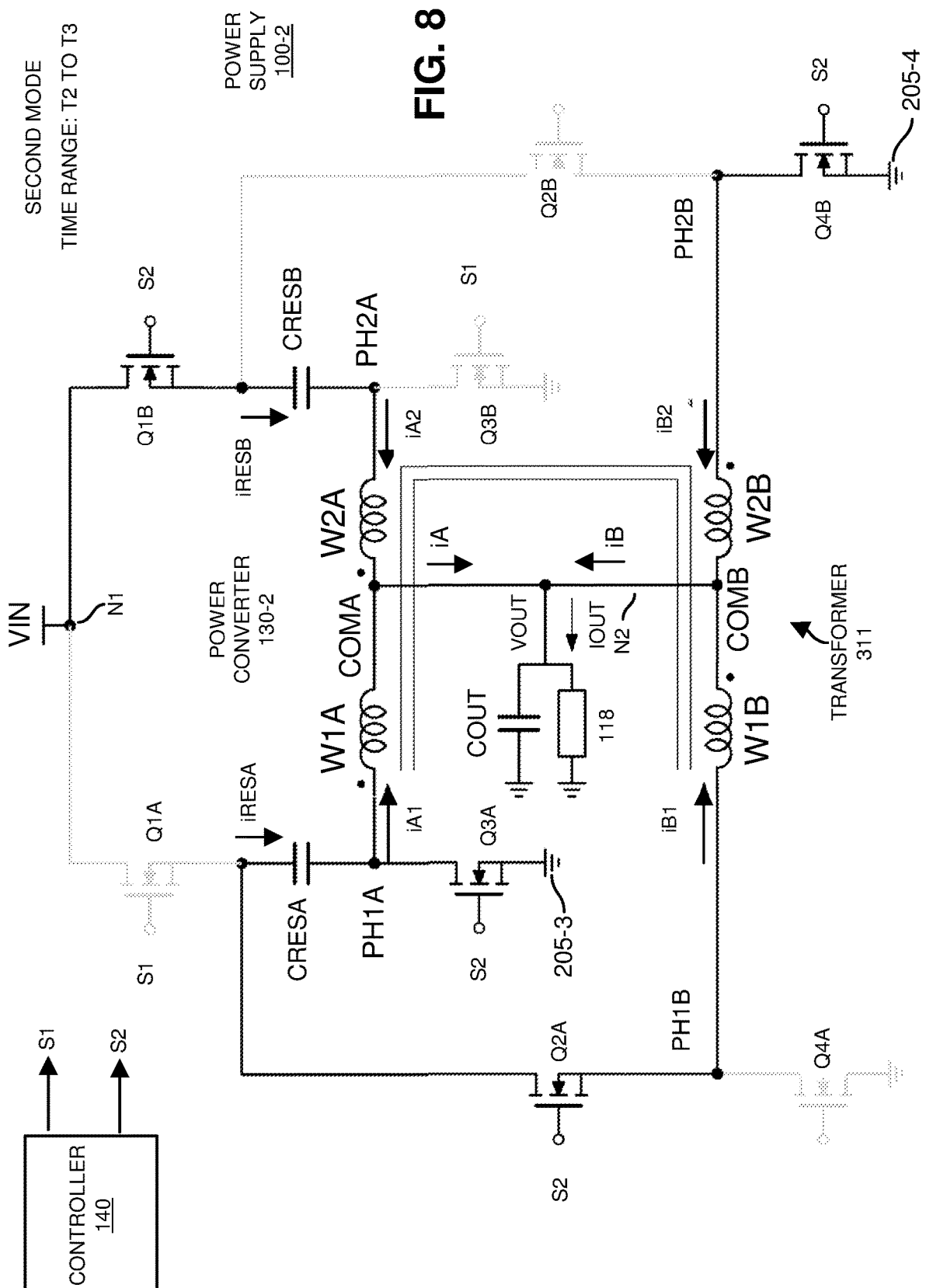
FIG. 8 is an example diagram illustrating operation of a power converter in a third mode as described herein.

Considering the converter described in FIG. 4 and following the converter waveforms (timing diagrams) shown in FIG. 5, the converter operations in one switching cycle TSW are described in four subintervals corresponded with the subintervals topological states shown in FIG. 6 (first mode), FIG. 7 (dead time), and FIG. 8 (second mode).

The four subintervals associated with graph 500 are described as follows:

First mode such as between T0 and T1: at t=T0 switches Q1A, Q4A, Q2B, and Q3B are turned on in ZVS and in zero current switching (ZCS) and the first resonant mode transition takes place between CRESA and the leakage inductance of the autotransformer from VIN, whilst the second resonant mode transition takes place between CRESB and the leakage inductance of the autotransformer from GROUND (205).

In this first mode as shown in FIG. 6, CRESA is soft-charged from the input voltage source VIN through the leakage, whilst CRESB is soft-discharged. When the capacitance of CRESA equals the capacitance of CRESB and the transformer 311 layout is symmetrical, the RMS current through each resonant capacitor is the same. Considering substantially perfect balance (or within 5% of each other) between the actual resonant current through CRESA and CRESB, iRESA (t)=−iRESB (t); and considering iRESA (t)=i_res (t) it follows that iA1=i_res (t). Considering physical identical number of turns on windings W1A=W1B=W2A=W2B, it follows that iA1=iA2=iB1=iB2.

In such an instance, the current iA1 flows through the first capacitor CRESA to the transformer winding W1A in a first portion (T0 to T1) of a control cycle during resonance of the first capacitor CRESA and the transformer winding W1A. The current iB2 flows from a node of the second capacitor CRESB through the transformer winding W2B in the first portion (T0 to T1) of the control cycle during resonance of the second capacitor CRESB and the transformer winding W2B.

FIG. 7 is an example diagram illustrating operation of a power converter in a second mode as described herein.

During the dead time between T1 and T2: At T1, switches Q1A, Q4A, Q2B, and Q3B are turned off. The parasitic capacitance (drain to source) of Q1B is charged to a voltage value of VIN−2*Vout, Q4A and Q3B are charged to 2*VOUT, Q2B is charged at the input voltage VIN. The parasitic capacitances of Q1B, Q4B, Q2A, and Q3A are discharged to zero volts, through the inductive energy stored in the L_zvs inductance at T1. When the charge of Q1B, Q4B, Q2A, and Q3A are discharged to zero, their body diodes start to conduct and enable ZVS turn on. The topological state is now reported in FIG. 7. The current i_(L_zvs) (at T1) that enables ZVS operation, is denoted as i_(L_(zvs.pk)), as shown in FIG. 5, which is given by the following equation:

$$I\_(L\_(zvs,\ pk)) = V\_out/(L\_zvs * f\_sw)$$

FIG. 8 is an example diagram illustrating operation of a power converter in a third mode as described herein.

In a second mode between T2 and T3: at T2, switches Q1B, Q4B, Q2A, and Q3A are turned on with ZVS. After T2, the resonant transition place between CRESB and the leakage inductance of autotransformer from VIN, whilst the second resonant mode transition takes place between CRESA and the leakage inductance from GND. Similarly to phase 1 (mode 1 between T0 and T1), but differently, CRESB is soft-charged from the input voltage source VIN in whilst CRESA is soft-discharged. The topological state is shown in FIG. 8. When the capacitance of CRESA=capacitance of CRESB and the transformer layout is symmetrical (same number of windings for W1A, W2A, W1B, W2B), the RMS current through each resonant capacitor is the same. Considering perfect balance between the actual resonant current trough CRESA and CRESB, iRES1 (t)=−iRESB (t); and considering iRESB (t)=i_res (t) it follows that iA2 (t)=i_res (t). Considering W1A=W1B=W2A=W2B, it follows that iA1=iA2=iB1=iB2.

Referring again to FIG. 7, the controller 140 implements a dead time between T3 and T4. For example, at T3, the controller 140 sets switches Q1B, Q4B, Q2A, and Q3A (such as all switches) off. The parasitic capacitance (drain to source) of Q1A is charged to VIN-2VOUT, switches Q4B and Q3A are charged to 2*VOUT, Q2A is charged at the input voltage VIN. The parasitic capacitances of switches Q1A, Q4A, Q2B, and Q3B are discharged to zero, through the inductive energy stored in the L_zvs inductance at T3. When the capacitances of Q1A, Q4A, Q2B, and Q3B are discharged to zero volts, their body diodes start to conduct and enable ZVS turn on. The topological state is now reported in FIG. 7. The current that enables ZVS is i_(L_zvs) (at T3) which correspond to [(−i)] _(L_(zvs.pk)). Thus i_(L_(zvs.pk)) is a good index to establish when ZVS condition is achieved for all switches. At T4, switches Q1A, Q4A, Q2B, and Q3B are turned on in ZVS which correspond with one-cycle of the switching period T_sw.

Thus, the power converter as discussed herein can be controlled by the controller 140 to operate in the first mode (FIG. 6) in which control of the network of switches (switch Q1A and Q3B ON) by the controller 140: i) creates a first series circuit path including a series connection of the first capacitor CRESA, the first transformer winding W1A, and the transformer winding W2A in a first series circuit path between an input voltage source (node N1) producing the input voltage VIN and a reference voltage source (ground reference 205-2) during a first portion (T0 to T1) of the respective control cycle; and ii) creating a second series circuit path including a series connection of the transformer winding W1B, the transformer winding W2B, and the capacitor CRESB in a second series circuit path between a first instance of the reference voltage (ground reference 205-1) source and a second instance of the reference voltage source (ground reference 2015-2) during the first portion of the respective control cycle (such as between T0 and T1).

The second operational mode in FIG. 8 includes, via control of the network of switches by the controller 140: i) creating a series circuit path including a series connection of the capacitor CRESA, the transformer winding W1B, and the transformer winding W2B between a third instance of the reference voltage source (ground reference 205-3) and a fourth instance of the reference voltage source (205-4) during the second portion (T2 to T3) of the respective control cycle; and ii) creating a fourth series circuit path including a series connection of the second capacitor CRESB, the third transformer winding W2A, and the first transformer winding W1A in a fourth series circuit path between the input voltage source VIN and the third instance of the reference voltage source 205-3 during the second portion of the control cycle.

In accordance with further examples such as FIG. 6, the network of switches and control by the controller 140 generates the output voltage 123 in the first mode (T0 to T1) including: i) charging of the first capacitor CRESA during resonance of the first capacitor CRESA and the transformer winding W1A supplying the current iA1 to an output node N2 of the power converter for a first portion (T0 to T1) of a respective control cycle, and ii) discharging of the second capacitor CRESB during resonance of the second capacitor CRESB and the transformer winding W2B supplying the current iB2 to the output node N2 of the power converter for the first portion (T0 to T1) of the respective control cycle.

In accordance with further examples such as FIG. 8, control of the network of switches 110 in the second mode includes: i) charging of the second capacitor CRESB during resonance of the second capacitor CRESB and the transformer winding W2A for a second portion (T2-T3) of the respective control cycle, the transformer winding W2A supplying current iA2 to the output node N2 of the power converter, and ii) discharging of the first capacitor CRESA during resonance of the first capacitor CRESA and the transformer winding W1B for the second portion (T2-T3) of the respective control cycle to produce current iB1.

In yet a further example, the first mode (FIG. 6) includes the controller 140: i) connecting a series combination of the first capacitor CRESA and the transformer winding W1A between an input voltage source VIN of node N1 producing the input voltage VIN and the output node N2 during a first portion (T0 to T1) of the respective control cycle; and ii) connecting the second capacitor CRESB and the transformer winding W2B in series between a reference voltage source (ground reference 205-2) and the output node N2 during the first portion (T0 to T1) of the respective control cycle. Additionally, the operation in the first mode include the controller 140: i) connecting the transformer winding W2A between the reference voltage source (205-2) and the output node N2 during the first portion (T0 to T1) of the respective control cycle; and ii) connecting the transformer winding W1B between the reference voltage source (ground reference 205-1) and the output node N2 during the first portion (T0 to T1) of the respective control cycle.

In yet a further example, the second mode (FIG. 8) includes the controller 140: i) connecting the series combination of the transformer winding W2B between the reference voltage source 205-4 and the output node N2 during a second portion (T2 to T3) of the respective control cycle; and ii) connecting the transformer winding W1A between the reference voltage source (ground reference 205-3) and the output node N2 during the second portion (T2 to T3) of the respective control cycle. Operation in the second mode further includes the controller 140: i) connecting the second capacitor CRESB and the transformer winding W2A in series between the input voltage source (node N1) and the output node N2 during the second portion (T2 to T3) of the respective control cycle; and ii) connecting the first capacitor CRESA and the transformer winding W1B in series between the reference voltage source (205-3) and the output node N2 during the second portion (T2 to T3) of the respective control cycle.

Figure 9:
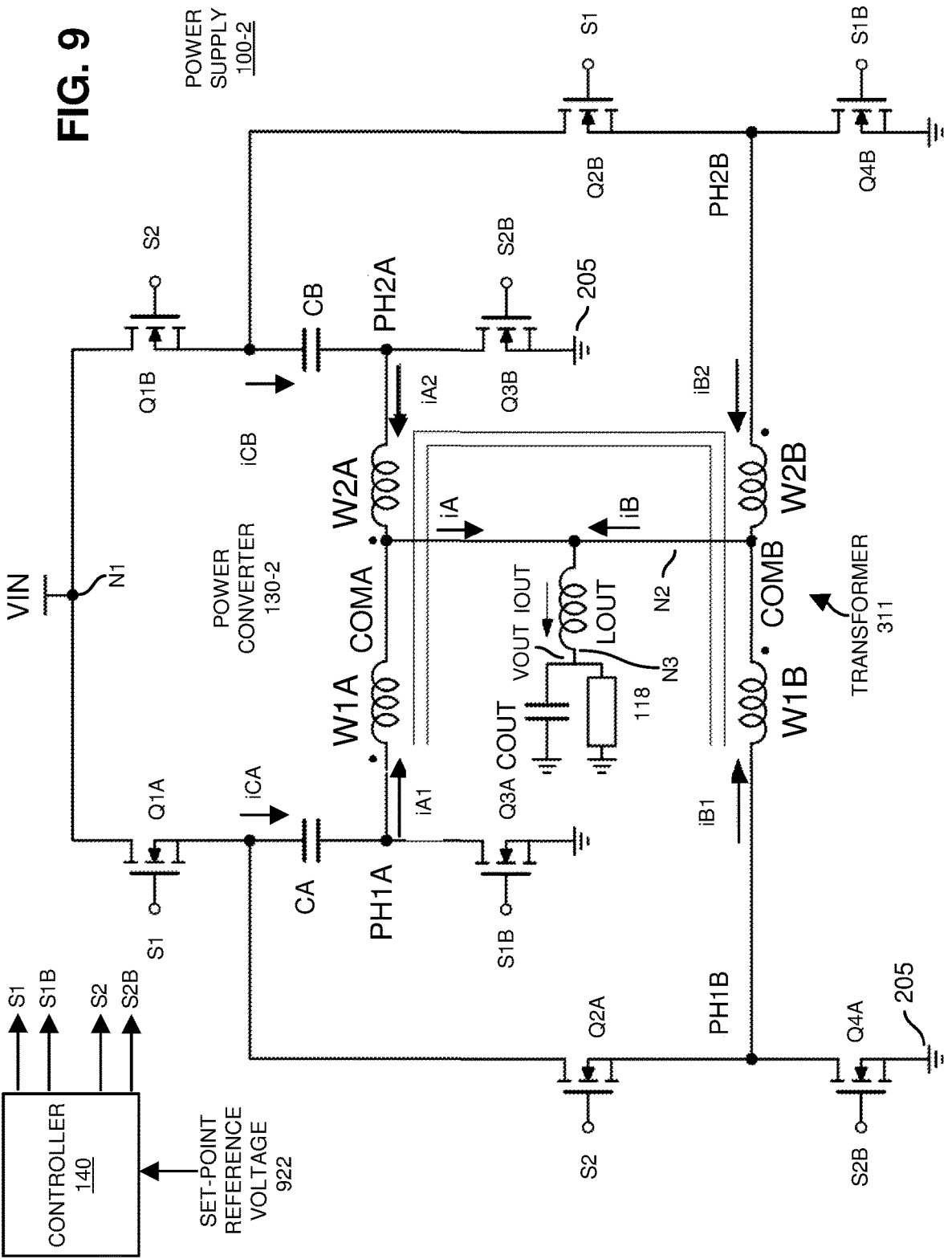
FIG. 9 is an example detailed diagram illustrating a power converter as described herein.

FIG. 9 is an example detailed diagram illustrating a power converter as described herein.

In this example, the power converter 130-2 includes an inductor LOUT between node N2 and the node N3 outputting the output voltage 123. For example, the power converter 130-2 can be configured to include an inductor device LOUT coupled between the output node N2 and a load 118. The inductor device LOUT outputs the output voltage 123 (VOUT) based on the first current iA1, iB2, iA2, and iB2 to power the load 118. The capacitor COUT stores the output voltage 123 (VOUT).

If desired, the controller 140 can be configured to control the switches in the power converter 130-2 based on a magnitude of the output voltage 123 with respect to a setpoint reference voltage. In such an instance, the controller 140 controls switching of the network of switches 110 to provide regulated conversion of the input voltage VIN (DC input voltage) into an output voltage 123 (such as DC output voltage), the output voltage 123 being regulated with respect to a desired setpoint reference voltage 922.

Thus, based on a modification of the circuit depicted in FIG. 5, it is possible in FIG. 9 to regulate the output voltage VOUT by adding an inductor LOUT between node N2 and node N3 and changing (adjusting) the duty cycle of the network of switch 110.

Figure 10:
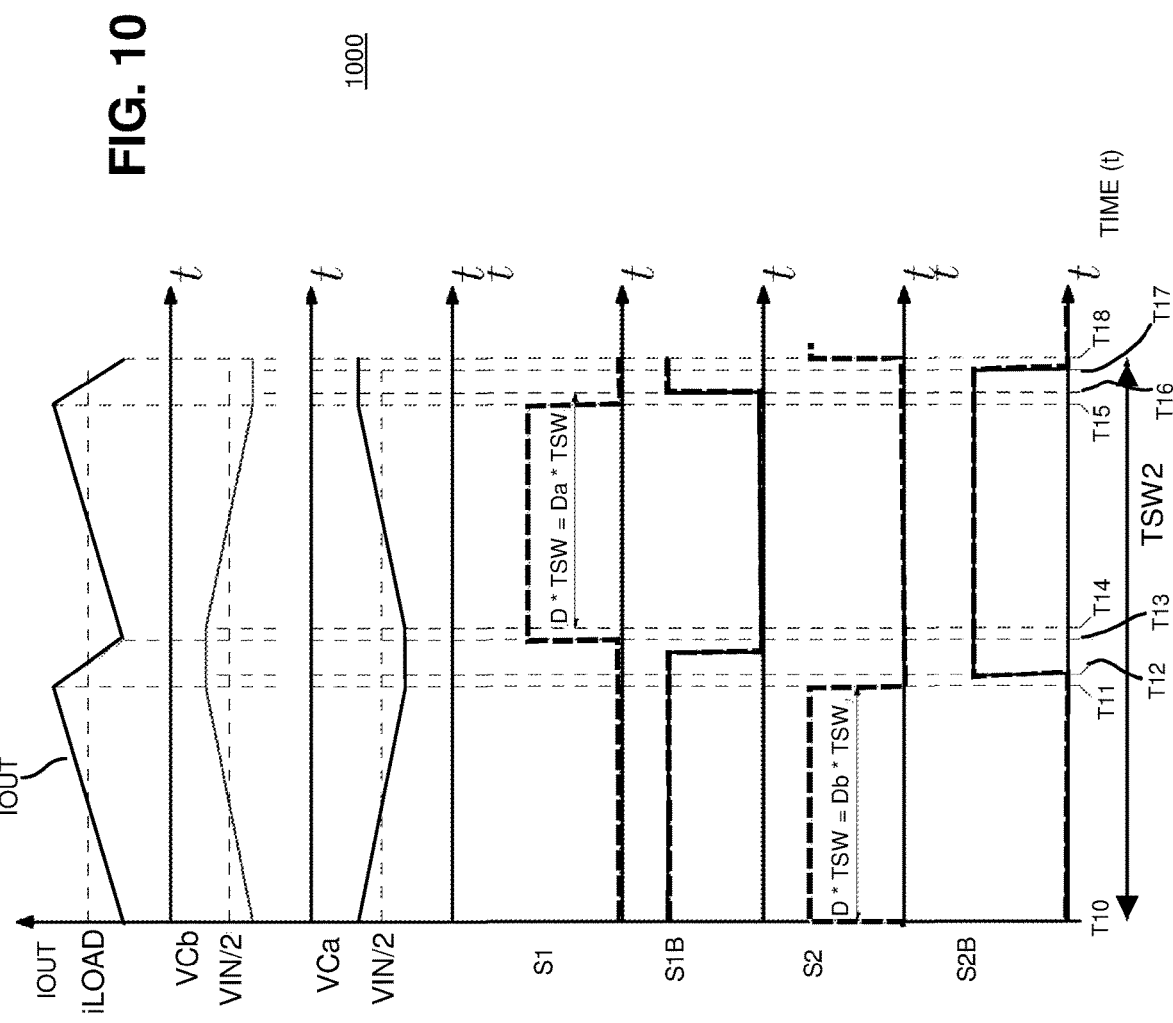
FIG. 10 is an example timing diagram illustrating control of multiple switches in a power converter as described herein.

The converter 130-2 in FIG. 9 can be seen from the control point of view as two-phase interleaved buck converters where S1 controls Q1A and Q2B and its respective negative part S1B (inversion of signal S1) controls Q3A and Q4B for rectification (or freewheeling); additionally, S2 controls Q2A and Q1B and its respective negative part S2B (inversion of signal S2) controls Q3B and Q4A for freewheeling operation, as represented in the timing diagram of FIG. 10.

With D being defined as the duty-cycle of the "buck derived topology" proposed in the timing diagram of FIG. 10, and considering D_A=D_B, the transfer function of the converter is defined by the following equation:

$$VIN/VOUT= 2/D \quad \text{(equation 6) With D<0.5 due to the interleaved structure.}$$

FIG. 10 is an example timing diagram illustrating control of multiple switches in a power converter as described herein.

In this example, the graph 1000 illustrates settings of control signals S1, S1B, S2, and S2B applied to the power supply 100-2 (FIG. 9) and corresponding power converter 130-2 over time and corresponding magnitudes of current associated with the voltage converter 130-2. The controller 140 varies transformer the duty cycle D of switches to maintain a magnitude of the output voltage VOUT or magnitude of the output current IOUT within a desired range.

Figure 11:
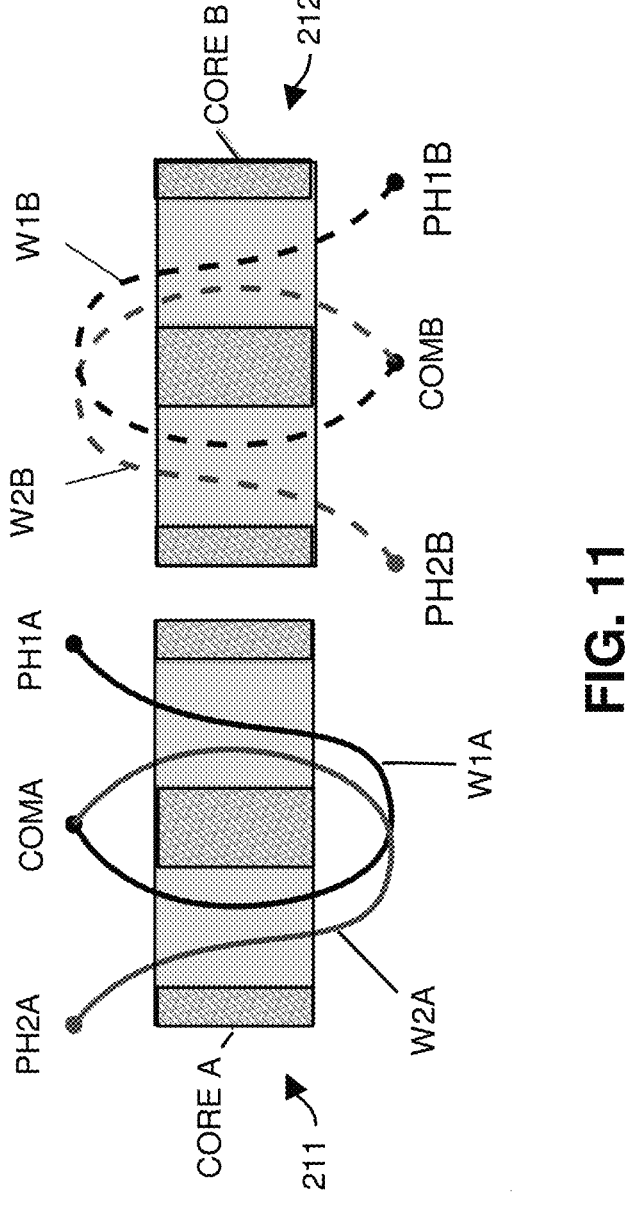
FIG. 11 is an example diagram illustrating of a transformer assembly as discussed herein.

FIG. 11 is an example diagram illustrating of a side cutaway view of a transformer assembly as discussed herein.

As previously discussed, the power converter as discussed herein can be configured to include two autotransformers (such as transformer 211 and transformer 212), where the first transformer 211 is charging the resonant capacitor and the second transformer 212 is discharging as previously discussed.

Each one of these two autotransformers (211 and 212) can be configured to include a set of windings, and they may be merged into a single core if desired. In this section, two main example S-HSC dual transformer implementation are proposed. Firstly, an example of decoupled autotransformers is proposed where CORE A (such as magnetic permeable material of transformer 211) and CORE B (such as magnetic permeable material of transformer 212) are actually not sharing the same magnetic element. An example of magnetic integration is proposed, where a smaller same core can be used for CORE A and CORE B.

As previously discussed, the proposed converter as discussed herein can be designed only for 4:1 conversion ratio, where windings W1A, W1B, W2A, and W2B have the same turns, such turns can be an "entire turn" around of the core area (i.e. 1, 2, 3, 4 . . . ) or "not entire turn" around of the core area (i.e. 0.5, 1.5, 2.5, 3.5 . . . ).

Before defining some possible structure for the double autotransformer (transformer 211 and transformer 212) for a respective power converter, it is desirable to understand the main requirements and constraints in such application. In such kind of applications, power requirements have been increasing in last few years, and based on this trend even in a IBC the $I^2$ R losses are becoming important, especially for a resonant converter. In an attempt to reduce the overall $I^2$ R losses of the converter, the design of the double autotransformer may be crucial, in this scenario the reduction of the all high current path is mandatory (i.e. by dislocate two autotransformer). The proposed double autotransformer structure as discussed herein can be configured to reduce dramatically the overall winding losses by selecting the optimal windings and core structure based on the module size.

FIG. 11 is an example diagram illustrating of decoupled double autotransformer implementations considering the electric circuit as shown in FIG. 2. The analysis of the double autotransformer (such as independent transformer 211 and transformer 212) can be done separately since they are not sharing a common magnetic path of magnetic permeable material. Considering W1A as "primary windings" and W2A as "secondary windings" (i.e. connected respectively between PH1A to COMA and from COMB to PH2A, equation (3) can be derived as previously discussed. Similar consideration can be taken for core B, resulting in the equation (4) (i.e., considering W1B as "primary windings" and W2B as "secondary windings", connected respectively between node PH1B to COMB and from COMB to PH2B.

As discussed herein, it is noted that of the power is processed by each autotransformer; moreover, due to the system flexibility, the two autotransformers can be displaced within the area based on the best power flow required by the application.

Figure 12:
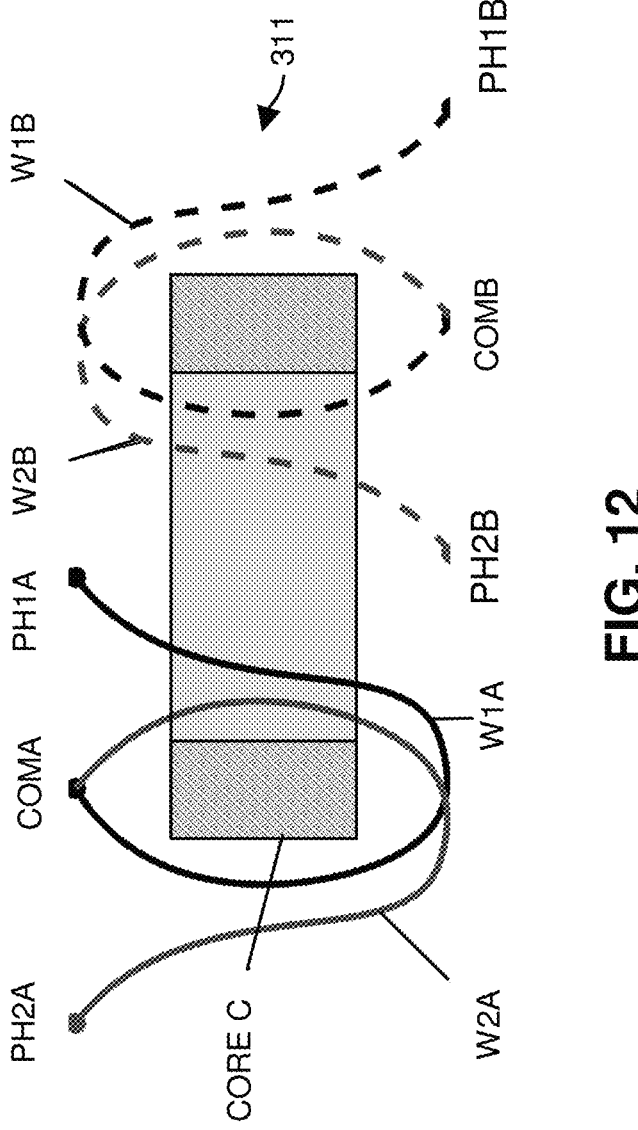
FIG. 12 is an example diagram illustrating of a transformer assembly as discussed herein.

FIG. 12 is an example diagram illustrating of a side cutaway view of a transformer assembly as discussed herein. This example includes a coupled double autotransformer for Symmetrical Hybrid Switched Capacitor converter.

Having two autotransformers may require two sets of the same core shape, resulting in double the occupation area for the core part. Therefore, a fully coupled double autotransformer can be implemented to enable the use of half of the core area, compared with the decoupled version. FIG. 12 shows a fully coupled autotransformer version where CORE A and CORE B have been integrated in a single C shape core called CORE C. As previously discussed, the four windings of the double autotransformers can be arranged within one magnetic structure where we consider as "primary windings" W1A and W1B whilst for "secondary windings" W2A and W2B are taken, therefore equation (5) can be obtained for the structure proposed in FIG. 12. Nevertheless, similar consideration can be done for every core shape (i.e. E, ER, etc.). Indeed, FIG. 13 proposes a dual fully-coupled autotransformer implemented within one E core.

Figure 13:
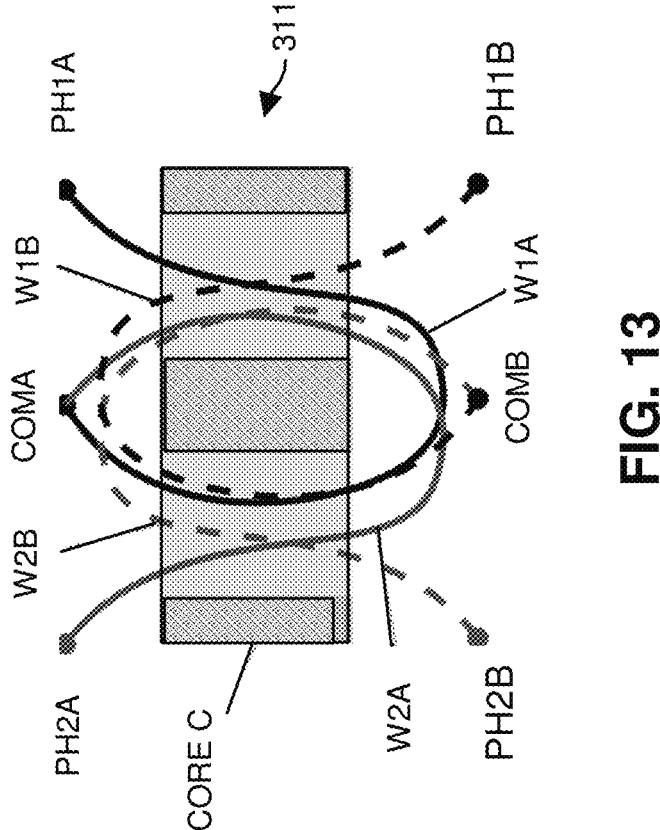
FIG. 13 is an example diagram illustrating of a transformer assembly as discussed herein.

FIG. 13 is an example diagram illustrating of a side cutaway view of a transformer assembly as discussed herein. In this example, two different double fully coupled autotransformer realizations for the "entire turn" are shown in FIGS. 13 and 14. FIG. 13 shows a distributed dislocation of phase nodes and output voltage nodes (i.e. preferable solution for vertical power flow), whilst in FIG. 14, the output voltage is positioned only on one side as well for the phase nodes (i.e. good for horizontal power flow).

FIG. 14 is an example diagram illustrating of a side cutaway view of a transformer assembly and placement of respective nodes with respect to a transformer as discussed herein. If flexibility is required at windings level (i.e., power flow direction) and/or different flux density in the core in FIG. 14 an implementation of the "non-entire" turn is proposed.

Figure 15:
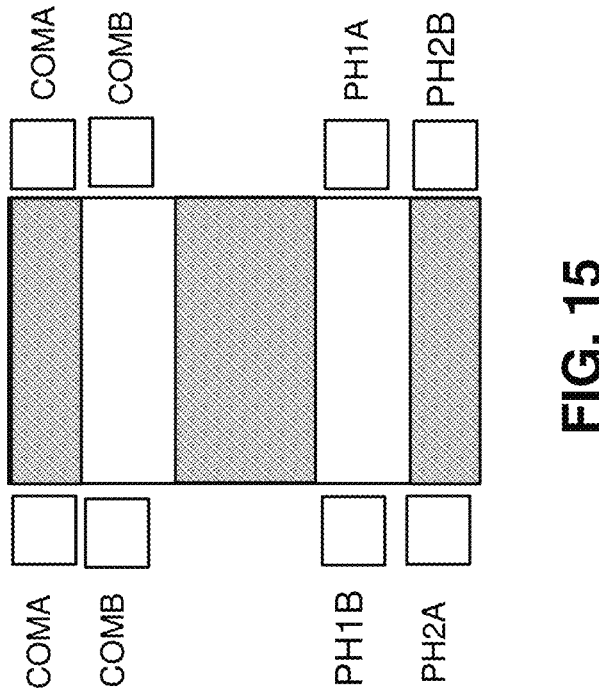
FIG. 15 is an example diagram illustrating of a transformer assembly as discussed herein.

FIG. 15 is an example diagram illustrating of a side cutaway view of a transformer assembly as discussed herein. This example illustrates a first possible configuration of different nodes of the transformer.

Figure 16:
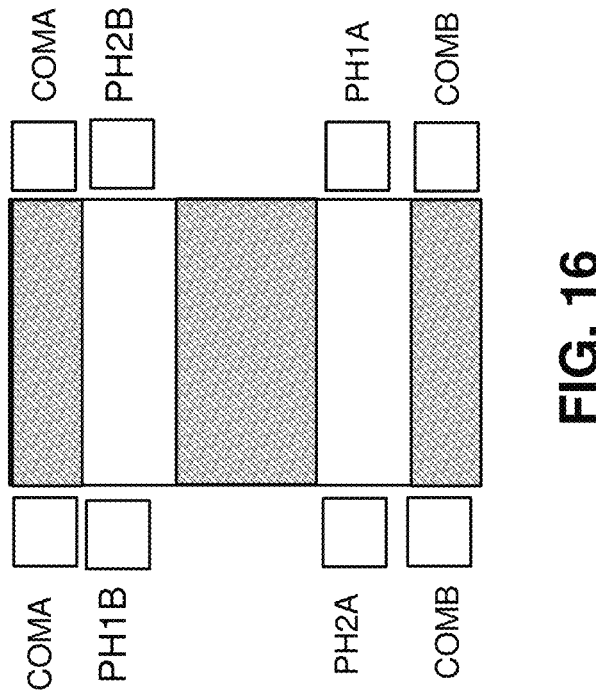
FIG. 16 is an example diagram illustrating of a transformer assembly as discussed herein.

FIG. 16 is an example diagram illustrating of a side cutaway view of a transformer assembly as discussed herein. This example illustrates a first possible configuration of different nodes of the transformer.

Figure 17:
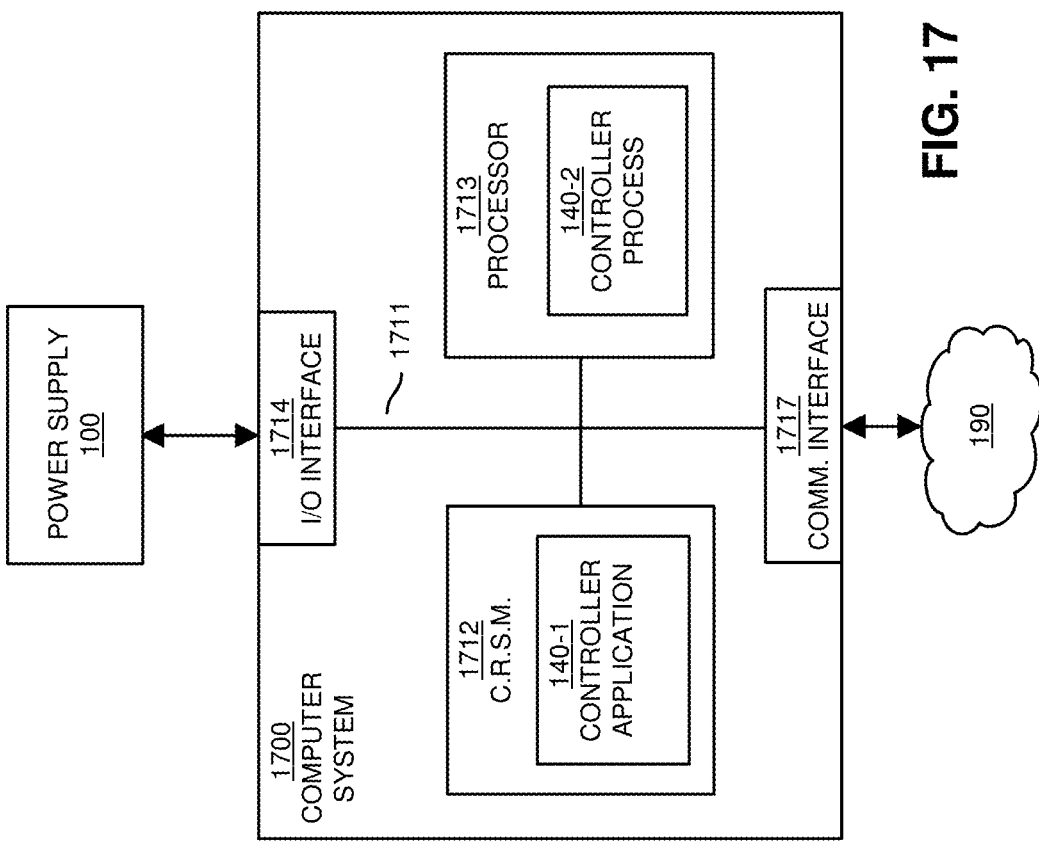
FIG. 17 is an example diagram illustrating implementation of a controller as discussed herein.

FIG. 17 is an example block diagram of a computer device for implementing any of the operations as discussed herein according to embodiments herein.

As shown, computer system 1700 (such as implemented by any of one or more resources such as controller 140, etc.) of the present example includes an interconnect 1711 that couples computer readable storage media 1712 such as a non-transitory type of media (or hardware storage media) in which digital information can be stored and retrieved, a processor 1713 (e.g., computer processor hardware such as one or more processor devices), I/O interface 1714, and a communications interface 1717.

I/O interface 1714 provides connectivity to any suitable circuitry such as one or more voltage converters.

Computer readable storage medium 1712 can be any hardware storage resource or device such as memory, optical storage, hard drive, floppy disk, etc. In one embodiment, the computer readable storage medium 1712 stores instructions and/or data used by the controller application 140-1 to perform any of the operations as described herein.

Further in this example embodiment, communications interface 1717 enables the computer system 1700 and processor 1713 to communicate over a resource such as network 190 to retrieve information from remote sources and communicate with other computers.

As shown, computer readable storage media 1712 is encoded with controller 140-1 (e.g., software, firmware, etc.) executed by processor 1713. Controller application 140-1 can be configured to include instructions to implement any of the operations as discussed herein.

During operation of one embodiment, processor 1713 accesses computer readable storage media 1712 via the use of interconnect 1711 in order to launch, run, execute, interpret or otherwise perform the instructions in controller application 140-1 stored on computer readable storage medium 1712.

Execution of the controller application 140-1 produces processing functionality such as controller process 140-2 in processor 1713. In other words, the controller process 140-2 associated with processor 1713 represents one or more aspects of executing controller application 140-1 within or upon the processor 1713 in the computer system 1700.

In accordance with different embodiments, note that computer system 1700 can be a micro-controller device, logic, hardware processor, hybrid analog/digital circuitry, etc., configured to control a power supply and perform any of the operations as described herein.

Functionality supported by the different resources will now be discussed via flowchart in FIG. 18. Note that the steps in the flowcharts below can be executed in any suitable order.

FIG. 18 is a flowchart 1800 illustrating an example method as discussed herein. Note that there will be some overlap with respect to concepts as discussed above.

In processing operation 1810, the controller 140 controls a network of switches 110 in a power converter 130 to generate an output voltage.

In processing operation 1822, the controller 140 controls the network of switches 110 to provide resonance of a first series circuit path including a first capacitor CRESA and a first transformer winding W1A supplying first current iA1 to an output node N2 of the power converter 130-1.

In processing operation 1824, the controller 140 controls the network of switches 110 to provide resonance of a second series circuit path including a second capacitor CRESB and a second transformer winding W2B supplying second current iB2 to the output node N2 of the power converter 130-2. The first current may be substantially equal to the second current.

Note again that techniques herein are well suited for use in power supply applications. However, it should be noted that the disclosure of matter herein is not limited to use in such applications and that the techniques discussed herein are well suited for other applications as well.

While this invention has been particularly shown and described with references to preferred aspects thereof, it will be understood by those skilled in the art that various changes in form and details may be made therein without departing from the spirit and scope of the present application as defined by the appended claims. Such variations are intended to be covered by the scope of this present application. As such, the foregoing description in the present disclosure is not intended to be limiting. Rather, any limitations to the invention are presented in the following claims.

The invention claimed is:

1. A power converter comprising:
a first capacitor;
a second capacitor;
a network of switches operative to control generation of an output voltage via: i) resonance of the first capacitor and a first transformer winding operative to supply a first current to an output node of the power converter, and ii) resonance of the second capacitor and a second transformer winding operative to supply a second current to the output node of the power converter; and
the first current being substantially equal to the second current;
the power converter further comprising:
a third transformer winding and a fourth transformer winding:
wherein the network of switches is further operative to control the generation of the output voltage via: i) resonance of the second capacitor and the third transformer winding supplying a third current to the output node of the power converter, and ii) resonance of the first capacitor and the fourth transformer winding supplying a fourth current to the output node of the power converter; and
wherein the fourth current is substantially equal to the third current.

2. The power converter as in claim 1 further comprising:
an inductor device coupled between the output node and a load, the inductor device operative to output the output voltage from the inductor device based on the first current and the second current to power the load.

3. The power converter as in claim 1 further comprising:
a transformer assembly including the first transformer winding magnetically coupled to the second transformer winding.

4. The power converter as in claim 1 further comprising:
a first auto-transformer including the first transformer winding; and
a second auto-transformer including the second transformer winding.

5. The power converter as in claim 1, wherein the first transformer winding and the second transformer winding are operative to provide a zero voltage switching of the switches.

6. The power converter as in claim 1, wherein the first current flows through the first capacitor to a node of the first transformer winding in a first portion of a control cycle during the resonance of the first capacitor and the first transformer winding; and
wherein the second current flows from a node of the second capacitor through the second transformer winding in the first portion of the control cycle during the resonance of the second capacitor and the second transformer winding.

7. The power converter as in claim 1 further comprising:

an input voltage node to receive an input voltage; and a controller operative to control switching of the network of switches to provide unregulated conversion of the input voltage into the output voltage, the output voltage generated from the first current, the second current, and corresponding induced current associated with the first transformer winding and the second transformer winding.

8. The power converter as in claim 1 further comprising:

an input voltage node to receive an input voltage; and a controller operative to control switching of the network of switches to provide regulated conversion of the input voltage into the output voltage, the output voltage regulated with respect to a desired setpoint reference voltage.

9. A power converter comprising:

a first capacitor:

a second capacitor:

a network of switches operative to control generation of an output voltage via: i) resonance of the first capacitor and a first transformer winding operative to supply a first current to an output node of the power converter, and ii) resonance of the second capacitor and a second transformer winding operative to supply a second current to the output node of the power converter; and the first current being substantially equal to the second current;

the power converter further comprising:

a third transformer winding;

a fourth transformer winding;

a first transformer assembly including the first transformer winding magnetically coupled to the third transformer winding;

a second transformer assembly including the second transformer winding magnetically coupled to the fourth transformer winding; and a controller operative to control switching of the network of switches between a first mode and a second mode for each respective control cycle of multiple control cycles of converting an input voltage into the output voltage at the output node;

wherein the network of switches is further operative to control generation of the output voltage via the first mode, the first mode including: i) charging of the first capacitor during resonance of the first capacitor and the first transformer winding supplying the first current to the output node of the power converter for a first portion of a respective control cycle, and ii) discharging of the second capacitor during resonance of the second capacitor and the second transformer winding supplying the second current to the output node of the power converter for the first portion of the respective control cycle; and wherein the network of switches is further operative to control generation of the output voltage via the second mode, the second mode including: i) charging of the second capacitor during resonance of the second capacitor and the third transformer winding for a second portion of the respective control cycle, the third transformer winding supplying third current to the output node of the power converter, and ii) discharging of the first capacitor during resonance of the first capacitor and the fourth transformer winding for the second portion of the respective control cycle, the fourth transformer winding supplying fourth current to the output node of the power converter.

10. The power converter as in claim 9, wherein the third current is substantially equal to the fourth current.

11. The power converter as in claim 10, wherein the first current, the second current, the third current, and the fourth current are substantially equal to each other.

12. A power converter comprising:

a first capacitor:

a second capacitor:

a network of switches operative to control generation of an output voltage via: i) resonance of the first capacitor and a first transformer winding operative to supply a first current to an output node of the power converter, and ii) resonance of the second capacitor and a second transformer winding operative to supply a second current to the output node of the power converter; and the first current being substantially equal to the second current;

the power converter further comprising:

a third transformer winding;

a fourth transformer winding;

a first transformer assembly including the first transformer winding magnetically coupled to the third transformer winding;

a second transformer assembly including the second transformer winding magnetically coupled to the fourth transformer winding; and a controller operative to control switching of the network of switches between a first mode and a second mode for each respective control cycle of multiple control cycles of converting an input voltage into the output voltage at the output node;

wherein the first mode includes the controller: i) connecting a series combination of the first capacitor and the first transformer winding between an input voltage source producing the input voltage and the output node during a first portion of the respective control cycle; and ii) connecting the second capacitor and the second transformer winding in series between a reference voltage source and the output node during the first portion of the respective control cycle; and wherein the second mode includes the controller: i) connecting the second transformer winding between the reference voltage source and the output node during a second portion of the respective control cycle; and ii) connecting the first transformer winding between the reference voltage source and the output node during the second portion of the respective control cycle.

13. The power converter as in claim 12, wherein the first mode further includes: i) connecting the third transformer winding between the reference voltage source and the output node during the first portion of the respective control cycle; and ii) connecting the fourth transformer winding between the reference voltage source and the output node during the first portion of the respective control cycle;

wherein the second mode further includes: i) connecting the second capacitor and the third transformer winding in series between the input voltage source and the output node during the second portion of the respective control cycle; and ii) connecting the first capacitor and the fourth transformer winding in series between the reference voltage source and the output node during the second portion of the respective control cycle;

wherein the first transformer winding is magnetically coupled to the third transformer winding; and wherein the second transformer winding is magnetically coupled to the fourth transformer winding.

14. The power converter as in claim 9, wherein each of the first transformer winding, the second transformer winding, the third transformer winding, and the fourth transformer winding are magnetically coupled to each other via magnetic permeable material.

15. The power converter as in claim 9, wherein the first mode includes, via control of the network of switches by the controller: i) creating a first series circuit path including a first series connection of the first capacitor, the first transformer winding, and the third transformer winding between an input voltage source producing the input voltage and a first instance of a reference voltage source during a first portion of the respective control cycle; and ii) creating a second series circuit path including a second series connection of the fourth transformer winding, the second transformer winding, and the second capacitor between the first instance of the reference voltage source and a second instance of the reference voltage source during the first portion of the respective control cycle; and wherein the second mode includes, via control of the network of switches by the controller: i) creating a third series circuit path including a third series connection of the first capacitor, the fourth transformer winding, and the second transformer winding between a third instance of the reference voltage source and a fourth instance of the reference voltage source during a second portion of the respective control cycle; and ii) creating a fourth series circuit path including a fourth series connection of the second capacitor, the third transformer winding, and the first transformer winding between the input voltage source and the third instance of the reference voltage source during the second portion of the control cycle.

16. The power converter as in claim 1, wherein a first node of the first transformer winding is directly coupled to the output node;

wherein a second node of the first transformer winding is directly coupled to the first capacitor;

wherein a first node of the second transformer winding is directly coupled to the output node; and wherein a second node of the second transformer winding is directly coupled to the second capacitor.

17. The power converter as in claim 1 further comprising:

the third transformer winding magnetically coupled to the first transformer winding;

the fourth transformer winding magnetically coupled to the second transformer winding; and wherein each of the first transformer winding, the second transformer winding, the third transformer winding, and the fourth transformer winding are directly coupled to the output node.

18. The power converter as in claim 1, wherein the network of switches is further operative to control generation of the output voltage via direct coupling of the third transformer winding to a reference voltage source; and wherein the network of switches is further operative to control generation of the output voltage via direct coupling of the fourth transformer winding to the reference voltage source.

19. The power converter as in claim 1 further comprising:

a controller operative to control the generation of the output voltage via switching between operation of the power converter in a first mode and operation of the power converter in a second mode;

wherein the operation of the power converter in the first mode includes the network of switches being controlled to connect a first series combination of the first capacitor and the first transformer winding between an input voltage source and the output node; and wherein the operation of the power converter in the second mode includes the network of switches being controlled to connect a second series combination of the second capacitor and the third transformer winding between the input voltage source and the output node.

20. A power converter comprising:

a first capacitor;

a second capacitor;

a network of switches operative to control generation of an output voltage via: i) resonance of the first capacitor and a first transformer winding operative to supply a first current to an output node of the power converter, and ii) resonance of the second capacitor and a second transformer winding operative to supply a second current to the output node of the power converter; and the first current being substantially equal to the second current;

the power converter further comprising:

a controller operative to control the generation of the output voltage via switching between operation of the power converter in a first mode and operation of the power converter in a second mode;

wherein the operation of the power converter in the first mode includes the network of switches being controlled to connect a first series combination of the first capacitor and the first transformer winding between an input voltage source and the output node; and wherein the operation of the power converter in the second mode includes the network of switches being controlled to connect a second series combination of the second capacitor and a third transformer winding between the input voltage source and the output node;

wherein the operation of the power converter in the first mode further includes the network of switches being controlled to connect a third series combination of the second capacitor and the second transformer winding between a reference voltage source and the output node; and wherein the operation of the power converter in the second mode further includes the network of switches being controlled to connect a fourth series combination of the first capacitor and a fourth transformer winding between the reference voltage source and the output node.

21. A power converter comprising:

a first capacitor;

a second capacitor;

a network of switches operative to control generation of an output voltage via: i) resonance of the first capacitor and a first transformer winding operative to supply a first current to an output node of the power converter, and ii) resonance of the second capacitor and a second transformer winding operative to supply a second current to the output node of the power converter; and the first current being substantially equal to the second current;

a controller operative to control the generation of the output voltage via switching between operation of the power converter in a first mode and operation of the power converter in a second mode;

wherein the operation of the power converter in the first mode further includes: i) the network of switches being controlled to connect the first capacitor and the first transformer winding in series between an input voltage source and the output node; and ii) the network of switches being controlled to connect a fourth transformer winding in between a reference voltage source and the output node; and wherein the operation of the power converter in the second mode further includes: i) the network of switches being controlled to connect the second capacitor and a third transformer winding in series between the input voltage source and the output node; and ii) the network of switches being controlled to connect the first capacitor and the fourth transformer winding in series between the reference voltage source and the output node.

\* \* \* \* \*